United States Patent [19]

Imoto et al.

[11] Patent Number: 5,508,830
[45] Date of Patent: Apr. 16, 1996

[54] LIQUID CRYSTAL DISPLAY UNIT HAVING AN ENCLOSED SPACE BETWEEN THE LIQUID CRYSTAL CELL AND AT LEAST ONE POLARIZER

[75] Inventors: Satoshi Imoto, Higashimurayama; Kohsei Miyabe, Kokubunji; Katsuo Matsuyama, Tokyo, all of Japan

[73] Assignee: Citizen Watch Co., Ltd., Tokyo, Japan

[21] Appl. No.: 199,139

[22] PCT Filed: Jun. 30, 1993

[86] PCT No.: PCT/JP93/00903

§ 371 Date: Feb. 25, 1994

§ 102(e) Date: Feb. 25, 1994

[87] PCT Pub. No.: WO94/00792

PCT Pub. Date: Jun. 1, 1994

[30] Foreign Application Priority Data

Jun. 30, 1992 [JP] Japan .................. 4-051311 U

[51] Int. Cl.⁶ .................... G02F 1/1335; G02F 1/1333
[52] U.S. Cl. .................... 359/40; 359/83
[58] Field of Search .................. 359/40, 41, 73, 359/53, 83

[56] References Cited

U.S. PATENT DOCUMENTS

| | | | |
|---|---|---|---|
| 3,890,628 | 6/1975 | Gurtler | 354/227 |
| 4,443,065 | 4/1984 | Funada et al. | 350/335 |
| 4,772,098 | 9/1988 | Ogawa | 350/331 T |
| 5,035,489 | 7/1991 | Iijima et al. | 350/335 |
| 5,107,356 | 4/1992 | Castleberry | 359/93 |
| 5,157,523 | 10/1992 | Yamagishi et al. | 359/41 |
| 5,249,071 | 9/1993 | Yoshimizu et al. | 359/63 |
| 5,291,322 | 3/1994 | Itoh et al. | 359/55 |
| 5,296,955 | 3/1994 | Tsujioka | 359/73 |
| 5,308,535 | 5/1994 | Scheuble et al. | 252/299.01 |

FOREIGN PATENT DOCUMENTS

| | | | |
|---|---|---|---|
| 0475401A3 | 3/1992 | European Pat. Off. . | |
| 58-211742 | 12/1983 | Japan | 359/40 |
| 63-046416 | 2/1988 | Japan . | |
| 63-105584 | 5/1988 | Japan . | |
| 2-69316 | 5/1990 | Japan . | |
| 2304416 | 12/1990 | Japan . | |
| 4-27929 | 1/1992 | Japan . | |
| 4060534 | 2/1992 | Japan . | |
| 4060533 | 2/1992 | Japan . | |
| 4-104124 | 4/1992 | Japan . | |
| 87/07394 | 12/1987 | WIPO . | |
| WO90/16005 | 12/1990 | WIPO . | |

*Primary Examiner*—William L. Sikes
*Assistant Examiner*—Charles Miller
*Attorney, Agent, or Firm*—Finnegan, Henderson, Farabow, Garrett, and Dunner

[57] ABSTRACT

In a liquid crystal display unit for use in a liquid crystal projector used in a high-temperature environment, this invention is directed to provide a liquid crystal display unit which prevents deterioration of the display unit and deformation of a polarizer plate due to temperature, and has a dust-proofing effect for a liquid crystal cell. The liquid crystal display unit 1 comprises at least one liquid crystal cell 2 and at least one polarizer member 3, and further includes a frame member 5 disposed for forming a space 4 between the polarizer member 3 and the liquid crystal cell 2, a vent hole 6 formed at at least a part of the frame member 5 and a filter 7 disposed in at least a part of the vent hole 6.

28 Claims, 15 Drawing Sheets

LIQUID CRYSTAL DISPLAY UNIT HAVING AN ENCLOSED SPACE BETWEEN THE LIQUID CRYSTAL CELL AND AT LEAST ONE POLARIZER

TECHNICAL FIELD

This invention relates to a structure of a liquid crystal display unit used in a high temperature environment, and a structure of a liquid crystal projector.

BACKGROUND ART

A typical example of a technology for effecting optical display in a high temperature environment using a liquid crystal cell is a liquid crystal projector which illuminates the back of a liquid crystal panel comprising, for example, a liquid crystal cell and a polarizer plate to form a projected image of the liquid crystal panel, and projects a magnified image of the liquid crystal panel by an optical system as a projection means.

Hereinafter, the structure and problems with the liquid crystal projector ordinarily known in the art will be explained. FIG. 1 is a schematic view of the known liquid crystal projector described in Japanese Unexamined Patent Publication (Kokai) No. 4-27929, and an air inlet is shown disposed at a part of a housing and a dust-proofing filter 401 is added to this air inlet.

In the liquid crystal projector shown in FIG. 1, since transmissivity of a polarizer plate 103 is low, about 60% of the light leaving illumination means 203, comprising light source means 201 and a condenser lens 202, is converted to heat at the polarizer plate 103.

Particularly in the liquid crystal projector, exothermy in the polarizer plate 103 becomes extremely high because luminance of a lamp as light source means 201 of the illumination means is high. Accordingly, a change in temperature characteristics and deterioration of the liquid crystal and of the polarizer plate occur due to this high temperature, and a drop in image quality of the projected image and a reduction in the service life of the liquid crystal cell 108 occur due to the high temperature.

Various technologies have been developed in the past to solve the temperature problems described above.

For example, Japanese Unexamined Utility Model Publication (Kokai) No. 2-69316 and Japanese Unexamined Patent Publication (Kokai) No. 4-27929 described above propose a solution. However, the liquid crystal projector shown in FIG. 1 employs a construction wherein illumination means 203 comprising mainly a light source lamp 201, a liquid crystal cell 108, and an optical system 300 comprising mainly a projection lens are accommodated in a casing 500 having a sealed structure and equipped with a cooling fan 400, a polarizer plate 103 and a liquid crystal cell 108 are spaced apart from each other, and the cooling fan 400 cools the inside of the liquid crystal projector so as to cool the polarizer plate 103 as well as the liquid crystal cell 108 and thus to prevent deterioration of the liquid crystal and the polarizer plate due to the heat.

Further, a dust-proofing filter 401 for preventing intrusion of the dust is disposed in front of the cooling fan 400 of the liquid crystal projector as shown in FIG. 1, so as to prevent deterioration of quality of the projected image due to the dust.

However, it has not been possible to completely eliminate the dust that has entered the liquid crystal projector during the production thereof and the dust that unavoidably enters when the lamp as the illumination means is exchanged. Accordingly, the dust that has entered the liquid crystal projector flies up due to the air pressure of the cooling fan or to the vibration or drop of the projector during transportation, and adheres to the surface of the liquid crystal cell. When the dust adheres to the liquid crystal cell, even if the dust is small, it is magnified by the optical system as the projection lens and deteriorates the quality of the projected image.

Once adhered to the surface of the liquid crystal cell, the dust cannot be removed easily because the the liquid crystal cell is sealed in the casing of the liquid crystal projector, and the liquid crystal projector cannot be disassembled without using a high level of skill and the jigs used by the manufacturer of the liquid crystal projector. Further, the liquid crystal cell may be damaged when removing the dust, and this damage results in a drop in the quality of the projected image.

Accordingly, no means has been available for effectively preventing adhesion of the dust in the liquid crystal projector to the surface of the liquid crystal cell, or a method of easily removing the dust when the dust adheres to the surface of the liquid crystal cell, and users must ask the manufacturer to disassemble the liquid crystal display unit. Thus, not only the cost is high, but use of the liquid crystal projector is curtailed.

On the other hand, the liquid crystal cell, too, has a problem in that its temperature characteristics change when the temperature rises and a drop in contrast occurs. This problem must be solved together with the problems described above.

DISCLOSURE OF THE INVENTION

It is an object of the present invention to provide a liquid crystal display unit which solves the problems in the prior art described above, exhibits an excellent cooling effect, and either does not allow the adhesion of the dust onto the surface of the liquid crystal cell or, if the dust does adhere, can prevent the dust from being seen in the image that is optically reproduced. The present invention is further directed to provide a liquid crystal display unit which prevents a change of contrast in the liquid crystal cell even when the temperature of the liquid crystal cell reaches a high temperature, and can always provide a high quality image, and furthermore, to provide a liquid crystal projector using such a liquid crystal display unit.

To accomplish the objects described above, the present invention provides the following technical constructions. Namely, the present invention provides a liquid crystal display unit comprising at least one liquid crystal cell and at least one polarizer member, and includes a frame member so disposed as to define a space between the polarizer member and the liquid crystal cell, a vent hole formed at at least a part of the frame member, and a filter disposed at at least a part of the vent hole, and a liquid crystal projector using the liquid crystal display unit.

The liquid crystal display unit according to the present invention will be explained in further detail. The liquid crystal display unit comprises, for example, a first polarizer member, at least one liquid crystal cell and a second polarizer member, and includes a frame member so disposed as to define a space at least between the first polarizer member and the liquid crystal cell or between the liquid crystal cell and the second polarizer member, a vent hole formed at at least a part of the frame member, and a filter disposed at at least a part of the vent hole. The liquid crystal projector uses the liquid crystal display unit having such a construction.

In other words, in the liquid crystal display unit according to the present invention, the space between the liquid crystal cell and the polarizer member is covered with a dust-proofing filter; hence, it is difficult for dust to enter the peripheral portion of the liquid crystal cell. In the liquid crystal projector using the display unit according to the present invention, the dust is not allowed to adhere to the liquid crystal cell even when dust is trapped inside the projector at the time of assembly or at the time of exchange of the lamp.

Even when the dust adheres to the outside surface of the polarizer member in the liquid crystal display unit according to the present invention, design is so made as to secure the space between the liquid crystal panel and the polarizer and to make this gap larger than the depth of focus of the lens constituting the optical system. According to this construction, even when the dust adheres to the surface of the liquid crystal cell, the dust is out of focus, and cannot be seen even when the projected image is observed. Accordingly, even when the dust adheres to the outside surface of the polarizer member, the influence of the dust on the quality of the projected image cannot be observed. As will be described later, too, the polarizer member can be in close contact with transparent glass. Accordingly, deformation of the polarizer plate due to heat can be prevented, and, when the polarizer plate is disposed in such a manner that the glass side is on the outside surface, the dust adhering to the outside surface of the transparent glass plate can be easily cleaned without damaging the polarizer plate.

BEST MODE FOR CARRYING OUT THE INVENTION

Hereinafter, definite examples of a liquid crystal display unit according to the present invention and a liquid crystal projector constituted by the use of this liquid crystal display unit will be described in detail with reference to the accompanying drawings.

Figure 1:
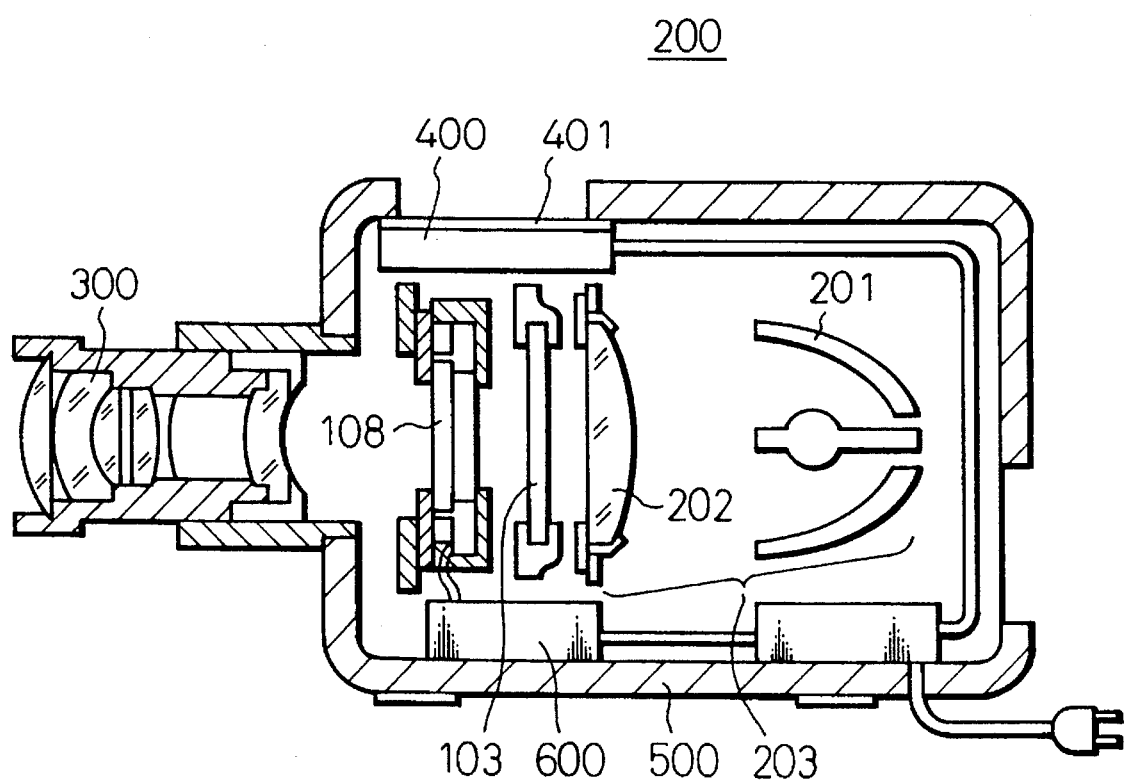
FIG. 1 is a schematic sectional view showing an example of a structure of a liquid crystal display unit according to the prior art and a liquid crystal projector using the liquid crystal display unit.
Figure 2:
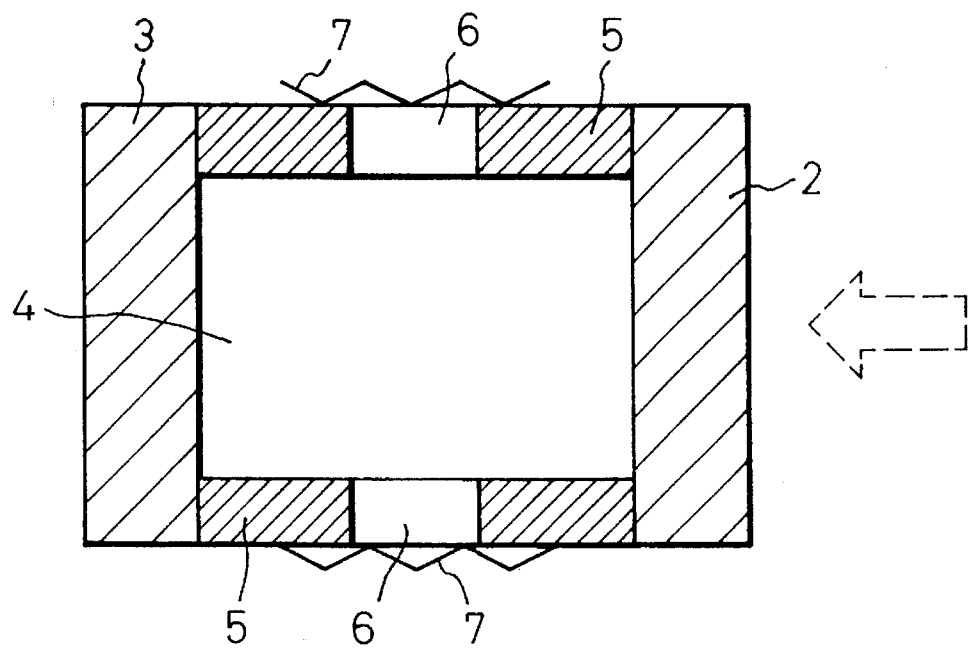
FIG. 2 is a schematic sectional view useful for explaining an example of the basic structure of a liquid crystal display unit according to the present invention.

FIG. 2 is a sectional view useful for explaining the basic structure of a liquid crystal display unit 1 according to the present invention. The drawing shows the liquid crystal display unit 1 which comprises at least one liquid crystal cell 2 and at least one polarizer member 3, and has a construction wherein a frame member 5 is so disposed as to define a space 4 between the polarizer member 3 and the liquid crystal cell 2, a vent hole 6 is bored at at least a part of the frame member 5, and a filter 7 is disposed at at least a part of this vent hole 6.

The structure of the liquid crystal cell 2 used in the present invention is not particularly limited, and a TN type liquid crystal cell or an STN type liquid crystal cell, which are known in the art, can be used. In connection with a driving method of these liquid crystal cells, it is possible to employ a passive type liquid crystal cell wherein a plurality of electrodes are juxtaposed with one another on the surfaces of liquid crystal support members opposing each other, and moreorever orthogonally, with one another between the liquid crystal support members, or an active type liquid crystal cell wherein active devices each comprising a transistor, or the like, are individually arranged in such a manner as to correspond to elements of the liquid crystal cells, respectively.

Figure 3:
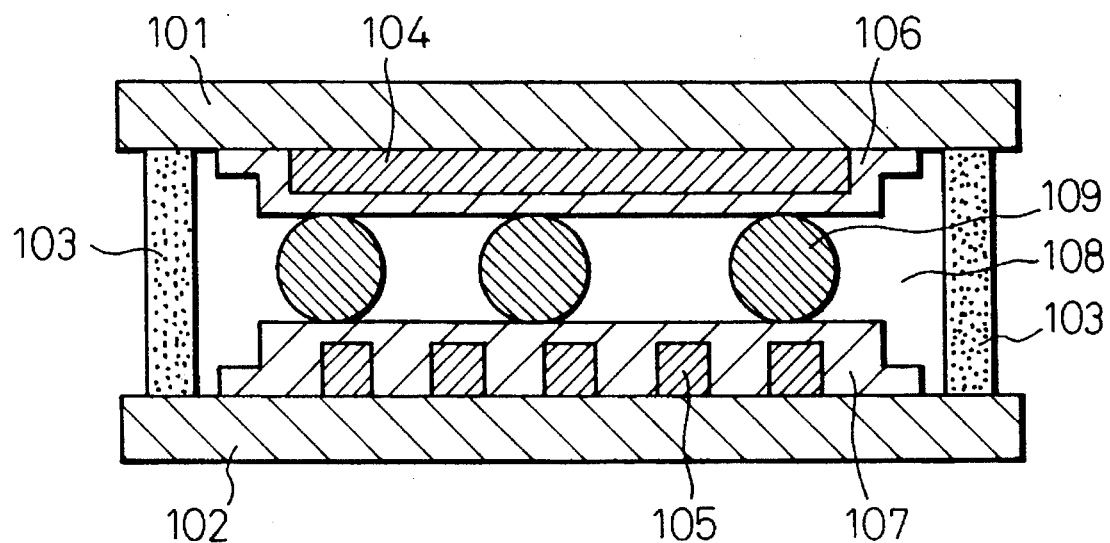
FIG. 3 is a sectional view showing an example of the structure of a passive type liquid crystal cell used as the liquid crystal cell for the present invention.

An example of the passive type liquid crystal cell which can be used in the present invention will be hereby explained with the sectional view of FIG. 3.

The passive type liquid crystal cell 100 includes a plurality of electrodes 104, 105 which comprise a conductor film, etc., and are juxtaposed on the inner surfaces of substrates 101, 102 so disposed as to oppose each other with a predetermined gap between them, and with a suitable seal member 103, interposed therebetween.

In other words, a plurality of electrodes 104 each comprising a conductor film are juxtaposed with one another on the inner surface of the substrate 101 and are covered with a suitable orientation film 106.

On the other hand, a plurality of conductor films 105 are juxtaposed with one another on the inner surface of the other substrate 102 at right angles to the direction of arrangement of the electrodes 104, and are covered with a suitable orientation film 107.

A suitable liquid crystal 108 is sandwiched in a space between the substrates 101 and 102 and a spacer 109 is mixed in this liquid crystal 108 so as to suitably keep the gap between the substrates.

Figure 4:
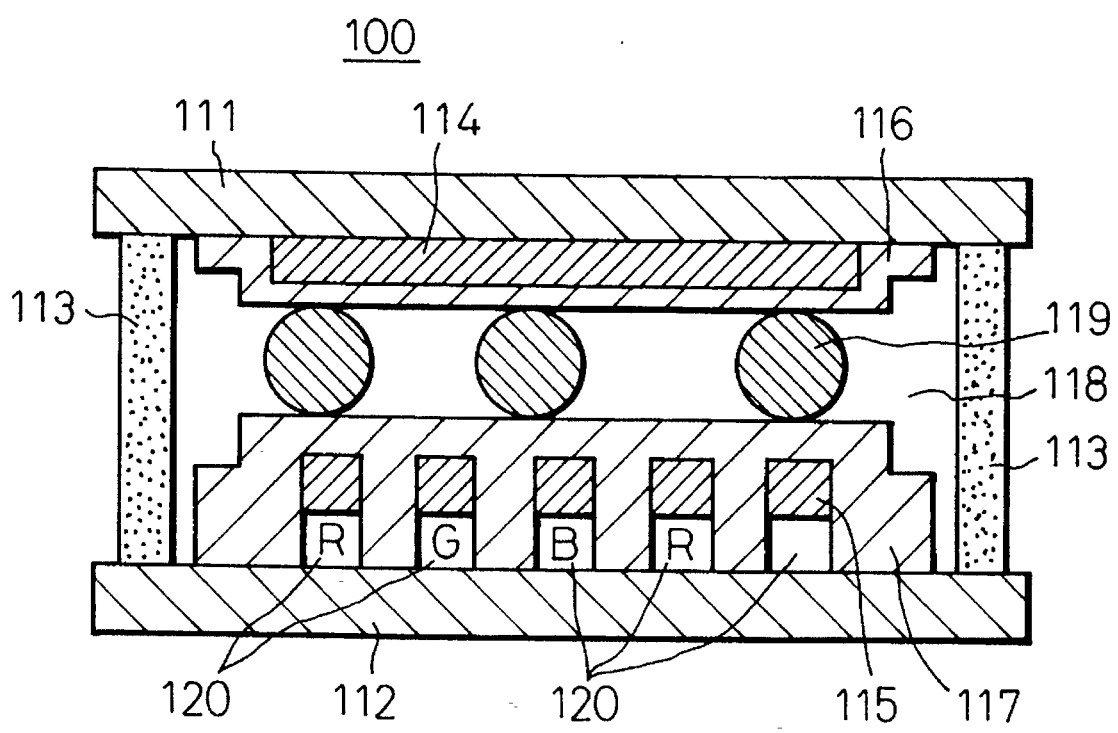
FIG. 4 is a sectional view showing an example of the structure of a passive type liquid crystal cell equipped with a color filter which is used as the liquid crystal cell for the present invention.

Another structural example of the passive type liquid crystal cell is shown in FIG. 4.

Fundamentally, this liquid crystal cell has exactly the same structure as that of the passive type liquid crystal cell 100 shown in FIG. 3, and the difference lies in that suitable color filters 120 are disposed on a conductor film 115 provided to the inside surface of the substrate 112 as shown in FIG. 4.

Figure 5:
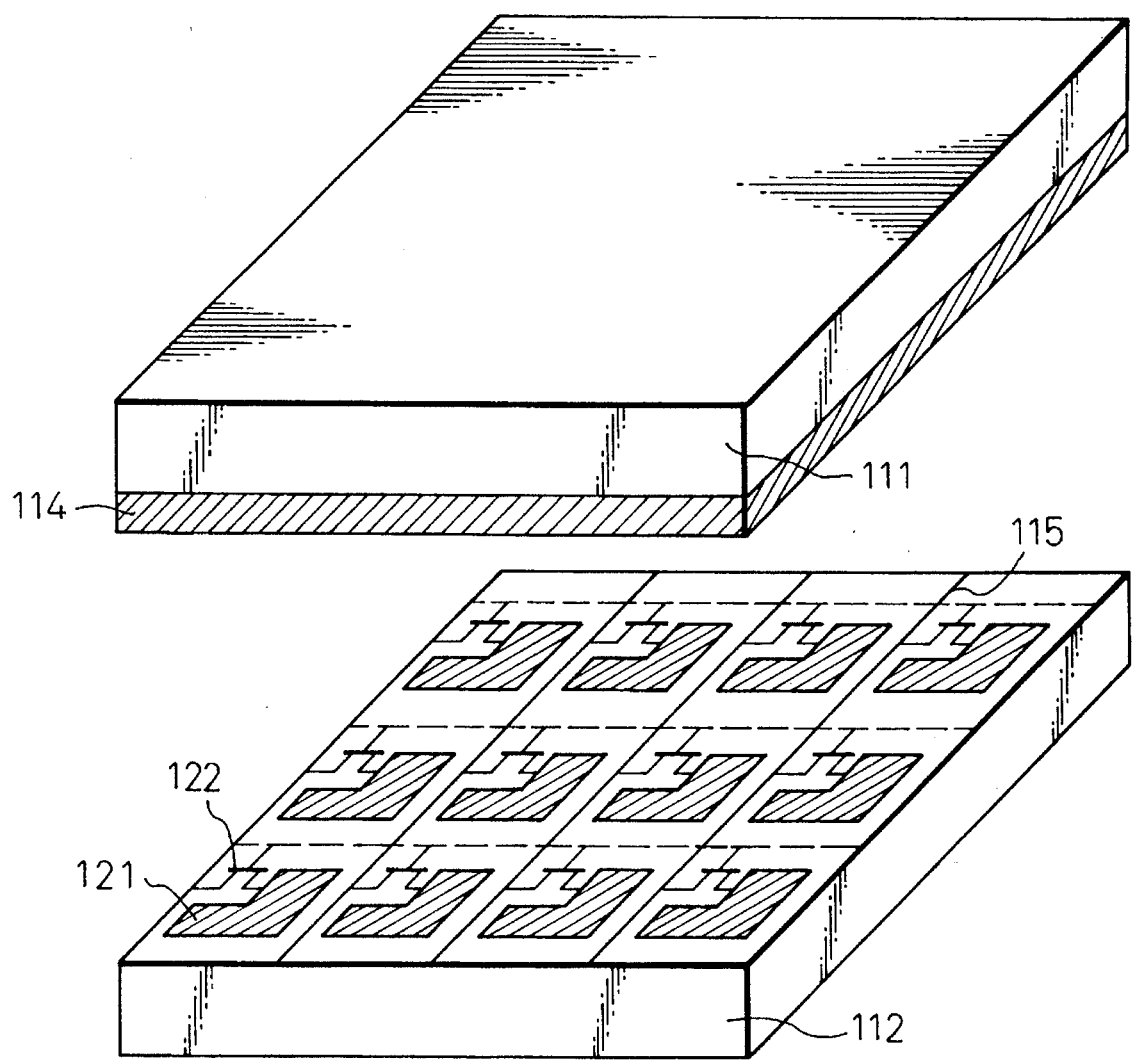
FIG. 5 is a partially exploded perspective view of an active type liquid crystal cell used for the present invention.

On the other hand, an example of an active type liquid cyrstal cell is shown in FIG. 5.

As shown in FIG. 5, the active type liquid crystal cell has a construction wherein an active device 122 comprising a transistor, or the like, is disposed on each of the pixel electrodes 121; hence, each pixel electrode is individually controlled by a signal.

In this active type liquid crystal cell, too, the color filters can be used.

On the other hand, the structure of the polarizer member 3 used in the present invention is not particularly limited, and a polarizer member that has been used ordinarily in the past can be used, too.

The materials, thickness, etc, of the polarizer member 3 are not particularly limited, either.

A polarizer member "G1220UD", a product of Nitto Denko K.K., for example, can be suitably used as the polarizer member 3 in the present invention.

Next, the frame member 5 used for the liquid crystal display unit according to the present invention will be explained. This frame member has the function of forming a suitable gap at least between the liquid crystal cell 2 and the polarizer member 3, and its size, length, etc, are varied in accordance with the size of the liquid crystal display units used, respectively.

In the present invention, connection between the frame member 5 and the liquid crystal cell 2 can be established by sandwiching a suitable liquid crystal cell support.

Figure 6A:
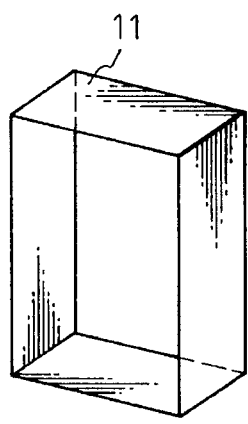
FIGS. 6(A) to 6(C) are perspective views each useful for explaining a definite embodiment of a frame member used in the liquid crystal display unit according to the present invention.

The frame member 5 shown in FIG. 2 may be composed of a member having four surfaces as shown in FIG. 6(A) comprising a sheet-like member 11 so that the space 4 between the liquid crystal cell 2 and the polarizer member 3 can be completely sealed, for example. In this case, the afore-mentioned vent hole or holes 6 are preferably bored at a suitable position or positions of the sheet-like member 11.

Figure 6B:
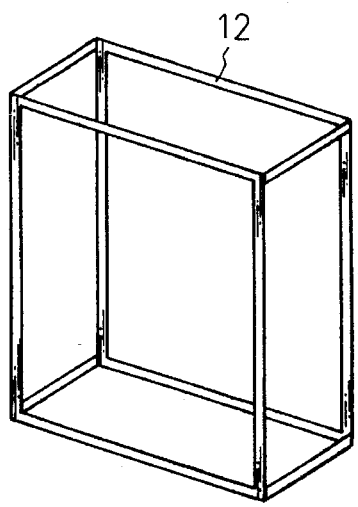

As to the frame member 5, a member assembled by rods, thin sheets 12, etc, only at portions corresponding to the outer peripheral portions of the space 4 can be used, as shown in FIG. 6(B).

In such a case, a suitable shield member is fitted to the peripheral portion of the frame member 12 so as to define a sealed space inside the frame assembly, and the vent hole 6 is formed at a suitable position. An airpermeable filter made of a non-woven fabric, a knitted fabric, or the like, may also be fitted as the shield member. In such a case, the vent hole 6 need not be disposed, in particular.

Figure 6C:
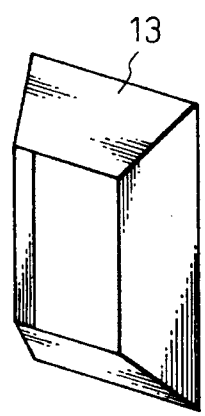

Alternatively, as shown in FIG. 6(C), a trapezoidal frame member 5 formed by mutually connecting four peripheral sheet portions 13 may be used as a modified member of FIG. 6(A).

In the present invention, any filter can be used as the filter disposed at at least a part of the vent hole so long as it has the function of easily passing an air stream but cutting off the dust, etc, which might cause problems. For example, a non-woven fabric, mesh knitted fabrics, etc, having a large number of voids thereinside, or a combination, may be used.

An example of the liquid crystal display unit 1 constituted by the use of the frame member shown in FIG. 6(C) corresponding to the frame member 5 shown in FIG. 2 will be explained with reference to FIG. 7.

Figure 7:
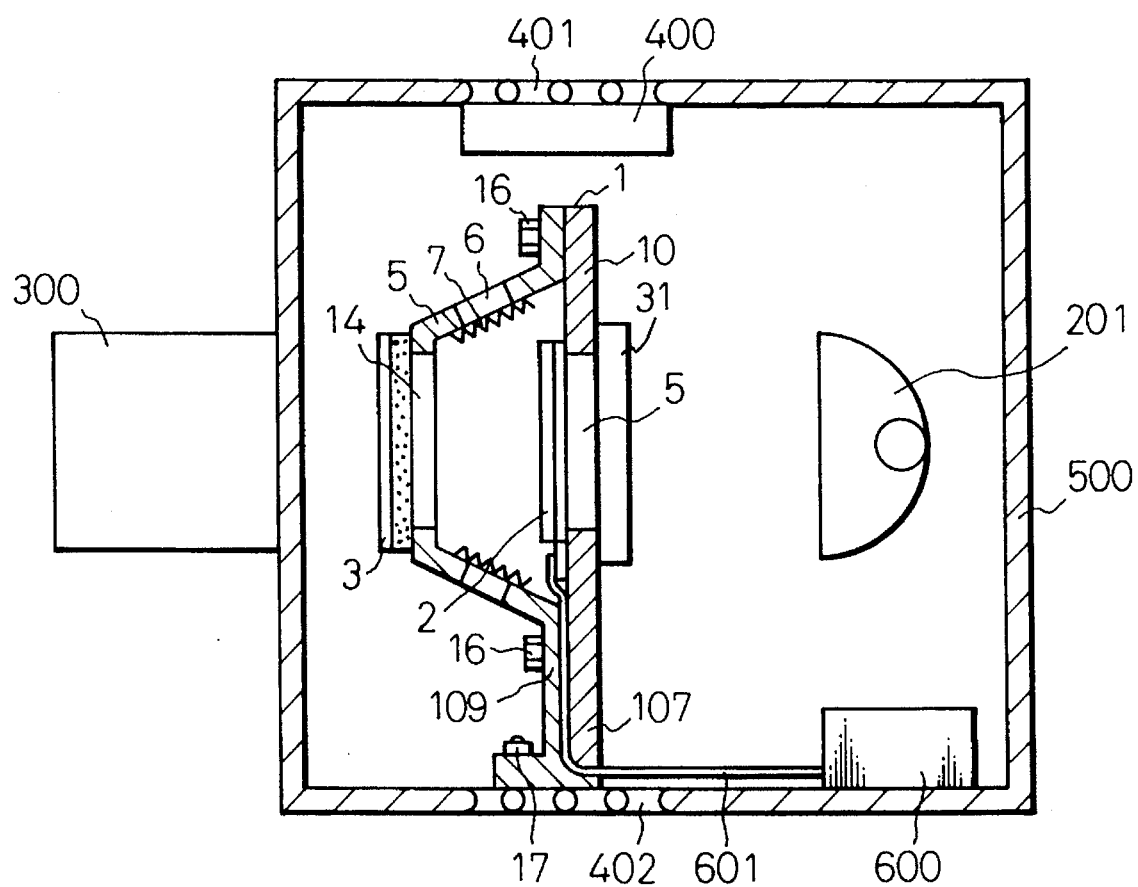
FIG. 7 is a sectional view showing a definite structural example of the liquid crystal display unit, and further shows an example of the construction of a liquid crystal projector constituted by the use of this liquid crystal display unit.

FIG. 7 shows an example wherein a liquid crystal projector 200 is constituted by the use of liquid crystal unit 1. In the drawing, a light source 201 constituting the afore-mentioned illumination means 203, the liquid crystal display unit 1 and a projection optical system 300 are disposed in such a manner that their optical axes are in parallel with, and touching, one another. The ray of light leaving the light source 201 passes through the liquid crystal cell 2 fitted to the liquid crystal cell support 10 that constitutes the liquid crystal display unit 1, then passes through the polarizer member 3 fitted to the frame member 5 molded into a trapezoidal shape, passes into the optical system 300 and forms a projection image.

The frame member 5 molded into the trapezoidal shape has a substantially prismatic shape and has a suitable opening 14 at a portion at which the polarizer member 3 is supported and fixed. On the other hand, a suitable opening 15 is bored at a substantial center of the liquid crystal cell support 10 so as to allow the passage of light to the liquid crystal cell 2.

The frame member 5 and the liquid crystal cell support 10 are fixed to each other by suitable connection means 16.

The liquid crystal display unit 1 is fixed to a part of a casing 500 which constitutes the liquid crystal projector 200, by a suitable fixing member 17.

In the liquid crystal projector 200 according to the present invention, a suitable vent hole 401 is formed at a part of the casing 500, and compulsive air circulation means 401 such as a suitable fan is preferably disposed at this vent hole 400.

Incidentally, reference numeral 402 denotes an exhaust port.

In other words, when the liquid crystal display unit 1 according to the present invention is used inside the liquid crystal projector 200, the portion of the liquid crystal cell 2 is generally disposed at a position near the light source 201 of the liquid crystal projector 200. Therefore, the liquid crystal cell 2 directly receives optical energy from the light source 201. Since this optical energy is built up inside the liquid crystal cell 2, the internal temperature rises inside the liquid crystal cell 2.

Accordingly, when the temperature of the liquid crystal cell 2 becomes high, the characteristics of the liquid crystal cell 2 deteriorate, depending on the temperature characteristics of the liquid crystal cell 2, and its contrast may drop. However, a cooling air stream is introduced from the vent hole 6 of the frame member 5 and cools the inside surface of the liquid crystal cell 2 so as to prevent the rise of the temperature of the liquid crystal cell 2 above a predetermined temperature. At the same time, when the frame member 5 seals the space between the liquid crystal cell 2 and the polarizer member 3 and a suitable filter 7 is disposed at the vent hole 6 disposed at a suitable position, the problem of intrusion and adhesion of the dust onto the surface of the liquid crystal cell 2, that has been the problem with the prior art devices, can be solved.

The explanation given above explains the fundamental structure of the liquid crystal display unit 1 according to the present invention, which comprises one liquid crystal cell 2 and one polarizer member 3. In the present invention, however, a plurality of polarizer members 3 can be used for one liquid crystal cell 2 or a plurality of liquid crystal cells 2 can also be used in the present invention.

Next, an example of the liquid crystal display unit 1 constituted by the use of one liquid crystal cell 2 and two polarizer members 3 in the present invention will be explained.

Figure 8:
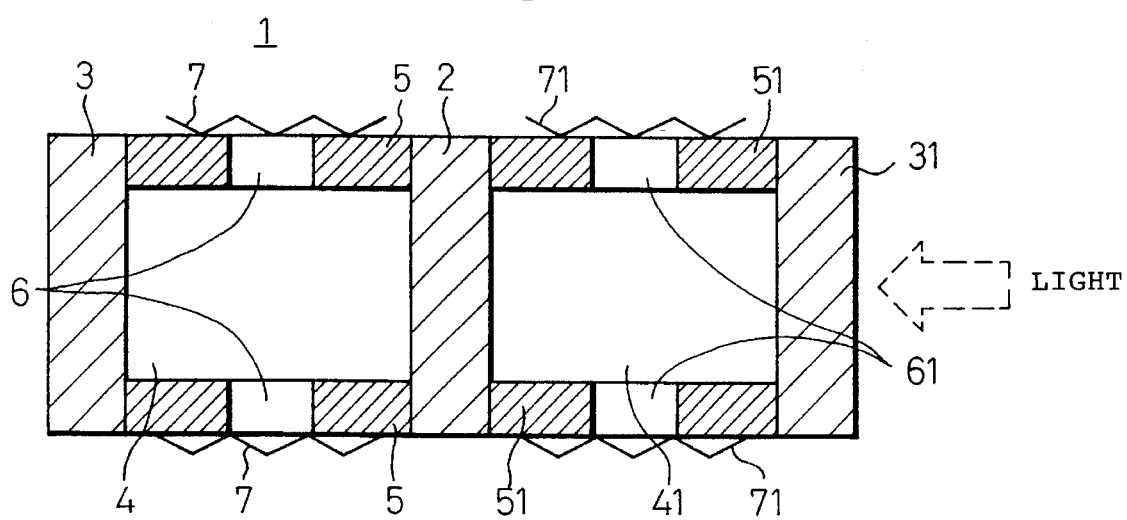
FIG. 8 is a sectional view showing a structural example of another embodiment of the liquid crystal display unit according to the present invention.

FIG. 8 is a sectional view useful for explaining the outline of the construction described above. The drawing shows the liquid crystal display unit 1 comprising a first polarizer member 31, at least one liquid crystal cell 2 and a second polarizer member 3. The liquid crystal display unit further includes a frame member 51 or 5 for defining a space 41 or 4 at least between the first polarizer member 31 and the liquid crystal cell 2 or between the liquid crystal cell 2 and the second polarizer member 3, a vent hole 61 or 6 disposed at at least a part of the frame member 51, 5, and a filter 71, 7 disposed at at least a part of the vent hole 61, 6.

Accordingly, the construction shown in FIG. 8 illustrates only one example of the technical construction of the present invention. For example, one of the spaces 41, 4 may be omitted and the liquid crystal cell 2 and either one of the polarizer members 31, 3 may be directly bonded.

In the definite embodiment of the present invention, the spaces 41, 4 between the first polarizer member 31 and the liquid crystal cell 2 and between the liquid crystal cell 2 and the second polarizer member 3 may be the same, or may be changed, whenever necessary.

Another definite structural example of the present invention will be explained with reference to FIG. 9. This drawing shows the construction wherein another polarizer member is so disposed on the opposite surface to the surface of the liquid crystal cell 2, on which the polarizer member 3 is disposed, as to oppose the polarizer member 3, in the construction shown in FIG. 7.

In other words, the frame member 51 having substantially the same structure as that of the frame member 5 in FIG. 7 is fitted to the liquid crystal cell support 10 of the liquid crystal display unit 1 in FIG. 7 on the side of the light source 201, and the first polarizer member 31 is disposed to the opening 41 of the frame member 51.

In this embodiment, the polarizer member 3 in FIG. 7 will be called "the second polarizer member", and the polarizer member 31 adjacent to the light source 201 in this embodiment will be called the "first polarizer member". Further, the frame member 5 in FIG. 7 will be called the "second frame member", and the frame member 51 close to the light source 201 in this embodiment will be called the "first frame member".

The construction in this embodiment will be explained in further detail. The definite example shown in FIG. 9 is fundamentally the same as the definite example shown in FIG. 7, and represents an example wherein the liquid crystal projector 200 is constituted by the use of the liquid crystal display unit 1. In FIG. 9, the light source 201, the liquid crystal display unit 1 and the projection optical system 300 are disposed in such a manner that their optical axes are in parallel with, and touching, one another. The ray of light leaving the light source 201 first passes through the first polarizer member 31 disposed on the first frame member 51 molded into a trapezoidal shape and fitted to the liquid crystal cell support 10 constituting the liquid crystal display unit 1, then passes through the liquid crystal cell 2 supported by the liquid crystal cell support 10, is incident into the optical system 300 and forms a projection image.

The first frame member 51 molded into the trapezoidal shape has a substantially primsatic shape, has a suitable opening 141 at the portion at which the first polarizer member 31 is supported and fixed, and is fixed to the liquid crystal cell support 10 by suitable connection means 161 such as, for example, screws.

The liquid crystal display unit 1 is fixed to a part of the casing 500 constituting the liquid crystal projector 200 by a suitable fixing member 17.

In the liquid crystal projector 200 according to the present invention, a vent hole 401 is formed at a suitable position of the casing 500, and air circulation means 400 such as a suitable fan, etc, is preferably provided at this vent hole 401.

Figure 10:
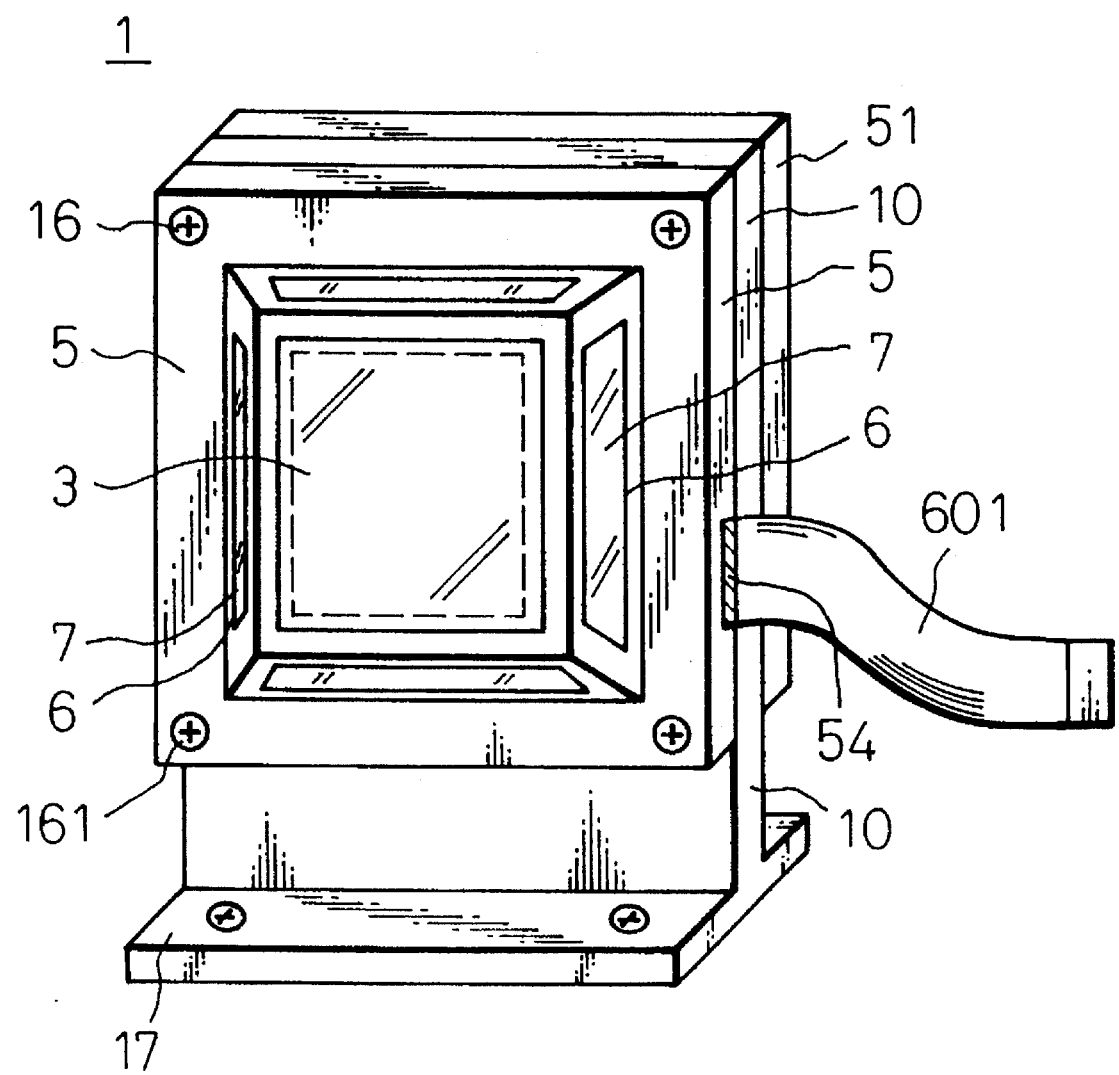
FIG. 10 is a perspective view showing a structural example of an enclosed type liquid crystal display unit used in the present invention.

FIG. 10 is a perspective view showing the appearance of the construction of the liquid crystal display unit 1 of this embodiment of the present invention. The unit 1 includes connection members 16, 161 for connecting and integrating the constituent members of the liquid crystal display unit 1 described above, and air is caused to flow inside the display unit 1 having at least two openings 6, 61 formed on the side surface portions thereof. A fixing end portion 17 is formed at the end portion of the liquid crystal cell support 10 so as to fix the support 10 to the casing 500. The display unit 1 comprises three members, that is, the first frame member 51, the liquid crystal cell support 10 and the second frame member 5, and these members are molded from a resin material, for example. The liquid crystal cell support 10 is clamped between the first and second frame members 5, 51, and the connecting end portion of each frame member is fastened by screws as an example of the connecting members 16, 161 described above so as to define a sealed structure.

When the fixing member 17 of the liquid crystal cell support 10 clamped in the way described above is fixed by screws to the casing 500, the liquid crystal display unit 1 is fixed to the casing 500. The frame members 5, 51 and the liquid crystal cell support 10 may be made of a resin, but the object of the present invention can also be accomplished by using other materials such as metal, ceramic, and so forth.

Figure 9:
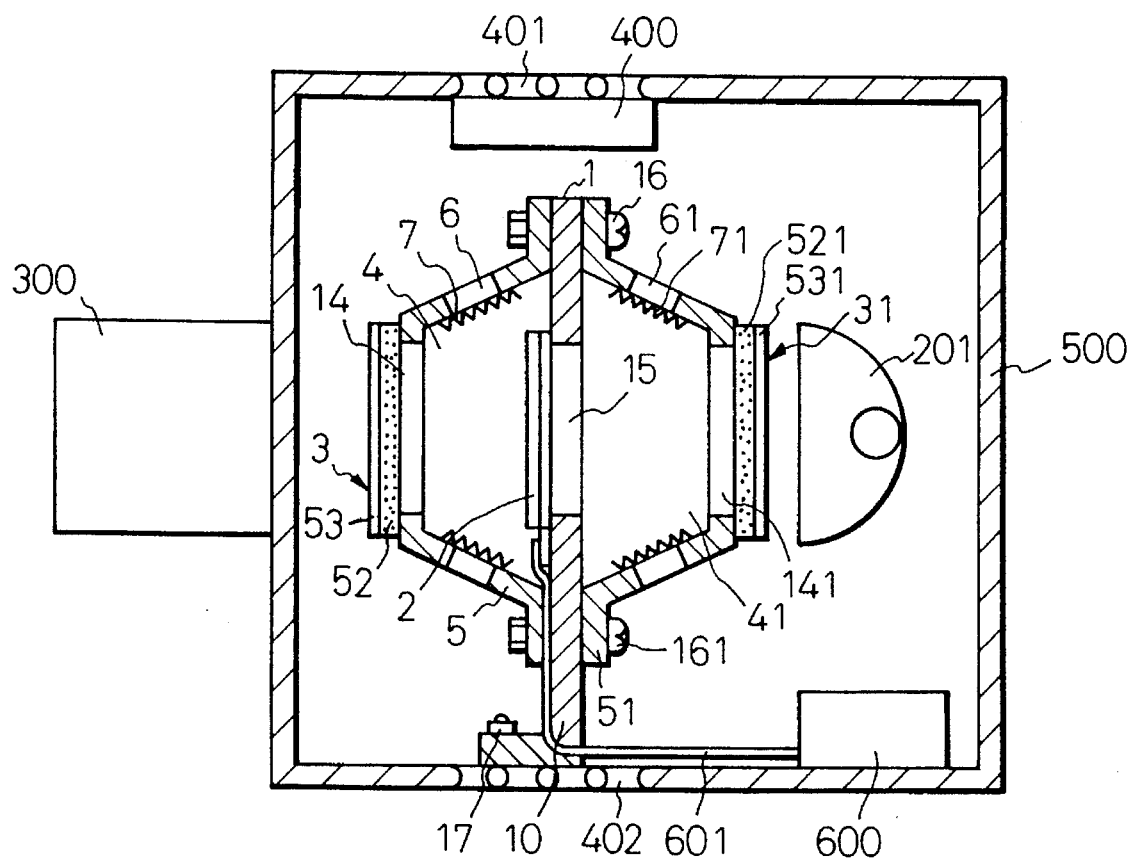
FIG. 9 is a sectional view showing a definite structural example of the liquid crystal display unit shown in FIG. 8, and is also a sectional view showing the liquid crystal projector constituted by the use of the liquid crystal display unit.

In the definite example shown in FIG. 9, the liquid crystal cell 2 is fixed by a bonding member to the liquid crystal cell support 10 so that it is positioned substantially vertical to the direction of the optical axis.

On the other hand, the first and second polarizer members 31 and 3 are bonded by a bonding material to the open end portions 14, 114 of the frame members 5, 51 on the opposite side to the liquid crystal cell 2. It is possible, for example, to use a member obtained by bonding a polarizer plate 53, 531 to transparent glass 52, 521, as the polarizer member 3, 31. Since the polarizer plate is bonded to heat-resistant glass in this case, deformation of the polarizer plate due to heat can be prevented. A double-face adhesive tape is preferably used as the bonding member for bonding the glass member to the polarizer plate as bonding efficiency can be improved in this way.

In the definite example of the present invention described above, the filter 7, 71 for preventing intrusion of the dust is disposed at the opening 6, 61 for passing the air, disposed on the side surface of the prasmatic frame member 5, 51. The filter having the construction described above, for example, may be provided by bonding or fusion, so that the inside of the liquid crystal display unit 1 assumes structure sealed to dust. Bonding by an adhesive may be used as a method of fitting the filter for preventing dust entering to the frame.

A driving circuit 600 for driving the liquid crystal cell 2 and forming a projection image is disposed inside the casing 500 of the liquid crystal projector 200, and is connected to the liquid crystal cell 2 by a thin flexible printed circuit (FPC) 601. A notch 54 corresponding to the thickness of the FPC 601 is formed in the frame member 5, 51. The filter of a non-woven fabric, for example, is disposed on the notch 54 and at the same time, wiring is made through the FPC. The frame member 5, 51 and the liquid crystal cell support 10 are combined and are then fixed by screws 16, 161, as connecting means, so as to seal the liquid crystal cell 2.

FIG. 10 shows a definite example of the sealed structure of the liquid crystal display unit 1 using the liquid crystal cell 2 of the present invention.

In the construction of the liquid crystal projector 200 according to the present invention, a suction port 401 for external air and an exhaust port 402 are formed in the casing 500 of the liquid crystal projector 200, a cooling fan 400 fitted to the casing 500 generates an air stream inside the casing 500, and the polarizer plate 3 and the liquid crystal cell 2 are cooled by this air stream through the filters 7, 71 fitted to the frame members 5, 51.

The explanation given above explains the case where the prismatic support frames 5, 51 are used for the structure of the liquid crystal display unit 1 of the present invention, but their shapes are arbitrary. The explanation given above deals with the case where the liquid crystal display unit 1 comprises the prismatic frame members 5, 51 for supporting the polarizer members 3, 31 and the liquid crystal cell support 10 for supporting the liquid crystal cell 2, but other structures may of course be used. In short, it is possible to employ a structure wherein the first polarizer member, the liquid crystal cell and the second polarizer member are disposed in order named and with gaps between them, respectively, and are integrally held, and wherein the spaces 4, 41 are connected to the openings 6, 61 of the frame members 5, 51, capable of ventillating with the outside and the openings 6, 61 are covered with the dustproofing filters 7, 71.

In the definite example of the invention described above, four openings 6, 61 for ventilation, in all, are shown disposed in the liquid crystal display unit, but the number of openings and their sizes are not particularly limited.

As another structural example of this embodiment, it is also possible to directly dispose the first polarizer member 31 on the surface of the liquid crystal cell support 10, to which the second frame member 5 is not bonded and which opposes the light source 201, without disposing the frame member 51.

In such a definite example, the gap portion defined in the liquid crystal cell support 10, that is, a window 15, defines the gap between the liquid crystal cell 2 and the first polarizer member 31.

In the definite example of the invention described above, only one liquid cell 2 is shown used, but two or more liquid crystal cells 2 can be used in combination.

The reason why the present invention uses the active type liquid crystal cell as the liquid crystal cell 2 is because the contrast of the display screen of the liquid crystal display unit comprising the liquid crystal cell is by far better than the liquid crystal cells of other types, and an angle of visibility, too, is greater than in other types of liquid crystal cells.

Figure 11:
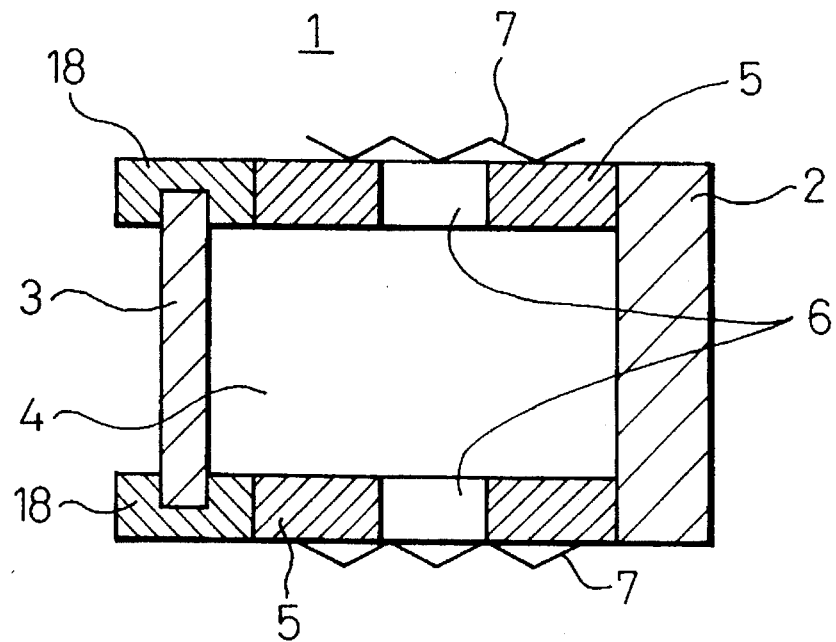
FIG. 11 is a sectional view useful for explaining an example of means for connecting a polarizer member to the frame member.

Furthermore, in the present invention, at least one of the polarizer members 3, 31 is preferably supported by a suitable polarizer member support 18 as shown in FIG. 11, and this polarizer member support 18 may be the frame member 5, 51 itself or may be bonded in a suitable form to the frame member 5, 51.

The polarizer member 3, 31 is fixed to, and supported by, the polarizer member support 18 by adhesion, bonding, fixing, fitting, and other suitable means.

When the polarizer plate support 18 is made of a light-transmitting material, this support 18 need not particularly be provided with an opening or a window for transmitting light at the portion corresponding to the opening provided to the frame member 5, 51 or to the window 14, 141, and it is possible to employ the structure where the polarizer member 3, 31 is directly bonded to the polarizer member support 18.

Figure 12:
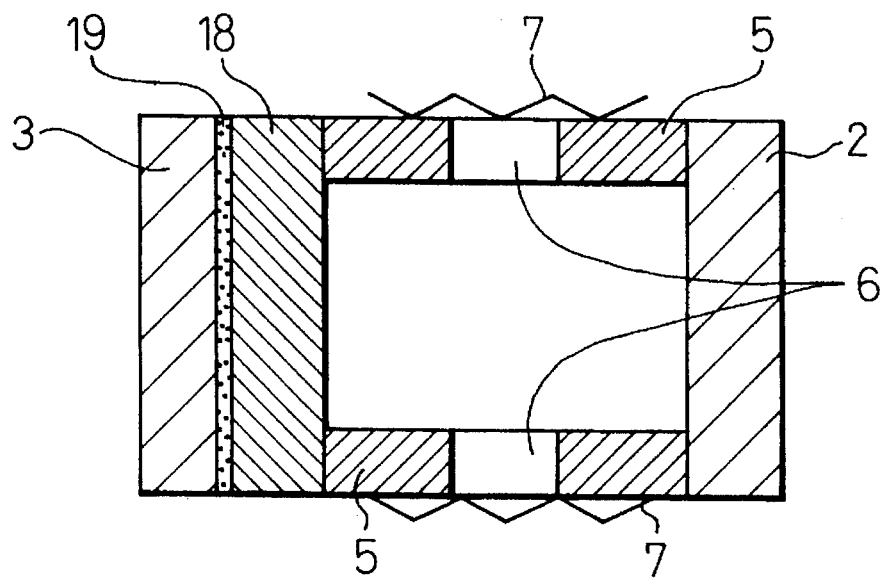
FIG. 12 is a sectional view showing an example wherein the polarizer member is bonded to a polarizer member support and constitutes an outside surface of the liquid crystal display unit.
Figure 13:
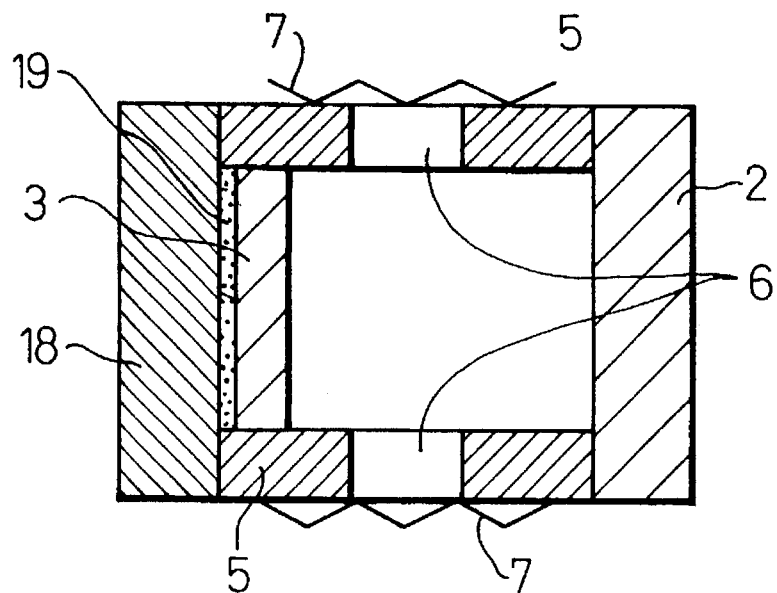
FIG. 13 is a sectional view showing an example wherein the polarizer member is bonded to the polarizer member support and constitutes an inside surface of the liquid crystal display unit.

FIGS. 12 and 13 are sectional views useful for explaining another embodiment of the present invention.

FIG. 12 shows the liquid crystal display unit 1 having a construction wherein the polarizer member 3 is bonded to the outside surface of the polarizer member support 18 by a suitable adhesive 19 so that the surface of the polarizer member 3 constitutes the outside surface of the liquid crystal display unit 1. FIG. 13 shows the liquid crystal display unit 1 having a construction wherein the polarizer member 3 is bonded to the inside surface of the polarizer member support 18 by a suitable adhesive so that the surface of the polarizer 3 constitutes the inside surface of the liquid crystal display unit 1.

Such constructions can be as such applied to the liquid crystal display unit 1 having the construction using the first and second polarizer members 3, 31 shown in FIG. 8.

In the embodiment described above, the polarizer member support 18 is preferably made of glass or a heat reflective filter or a suitable plastic material.

When the material constituting the polarizer member support 18 is glass in the present invention, this glass preferably has heat absorption property, and is preferably the Kind 1 IR-absorption glass as stipulated in JIS R3207, for example.

In other words, in the embodiment described above, the polarizer member 3 has a structure obtained by bonding transparent glass and the polarizer member so as to prevent deformation of the polarizer plate 3.

As an example where the polarizer member 3 is bonded to the frame member 5 as the prismatic support, FIG. 12 shows the example where the polarizer is so disposed as to constitute the outside surface of the liquid crystal display unit 1 and glass 18 is so disposed as to exist on the internal side of the liquid crystal display unit 1. In this case, however, there is the possibility that the polarizer plate 3 is damaged when the dust adhering to it is cleaned. Therefore, if the arrangement is made in such a manner that the surface of glass 18 becomes the outside surface, the dust adhering to the surface of glass 18 can be removed without damaging the polarizer plate 3, and the effect of the present invention can be further improved. Needless to say, the polarizer member 3 may have a structure obtained by closely sandwiching the polarizer plate 3 by two transparent glass 18 and in this case, bonding between the polarizer plate and glass becomes unnecessary.

As already described, the material of the liquid crystal cell used in the present invention is not particularly limited but in order to obtain the desired performance from the liquid crystal display unit, the liquid crystal cell is preferably constituted by a liquid crystal the liquid cyrstal molecules of which have a twist angle α within the range described below:

$$180° \leq \alpha$$

More preferably, the twist angle α is from 240° to 270°.

As a liquid crystal cell that satisfies the condition described above, a super-twist nematic type (STN) liquid crystal is preferably used, for example.

As also described already, it has been found that in the liquid crystal display unit according to the present invention, the image display characteristics of the liquid crystal cell 2 used for the liquid crystal display unit 1 are greatly affected by temperature, and when the liquid crystal display unit 1 is used in a high temperature as in one of the definite examples, there might occur a problem in that the contrast changes.

Accordingly, in the present invention, this problem can be solved by using a member made of a light transmitting material and having opposite temperature characteristics to the temperature characteristics of the liquid crystal cell 2 as a correction member, in combination.

Figure 14:
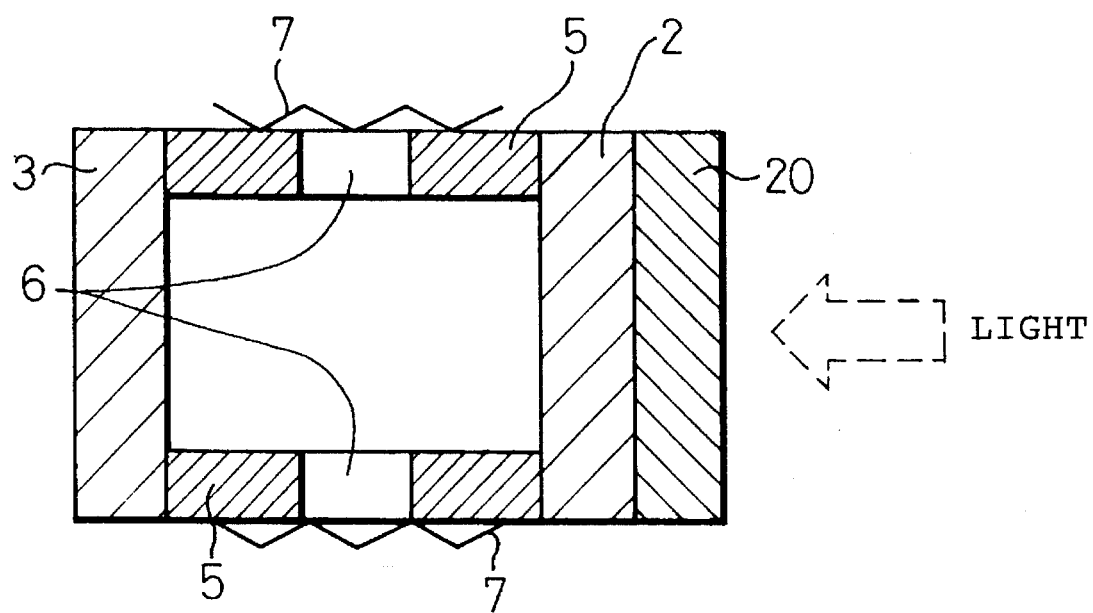
FIG. 14 is a sectional view useful for explaining a structural example of a liquid crystal display unit further provided with a phase correction member in another embodiment of the present invention.

In another embodiment of the liquid crystal display unit 1 of the present invention, the liquid crystal display unit 1 comprises at least one liquid crystal cell 2, at least one polarizer member 3 and at least one phase correction member 20 as shown in FIG. 14, wherein the phase correction member 20 is made of a light transmitting material having opposite temperature characteristics to those of the liquid crystal cell 2.

Such a phase correction member 20 is made of a light transmitting material having temperature characteristics opposite to those of the liquid crystal cell 2. Therefore, when the temperature changes, the change of the characteristics on the basis of their temperature characteristics mutually offset, so that flat temperature characteristics can be formed. Accordingly, the problem that the colors of the image change at high temperatures can be avoided.

Such a phase correction member 20 may be bonded to the liquid crystal cell 2 used in the liquid crystal display unit 1 or may be so disposed as to oppose the liquid crystal cell 2 through a suitable gap between them.

In other words, as shown in FIG. 14, the liquid crystal display unit 1 according to another embodiment of the present invention comprises at least one liquid crystal cell 2, at least one polarizer member 3 and at least one phase correction member 20. This liquid crystal display unit 1 includes the frame member 5 for defining the space at least between the polarizer member 3 and the liquid crystal cell 2 or between the liquid crystal cell 2 and the phase correction member 20 or the polarizer member 3 and the phase correction member 20, the vent hole 6 formed at at least a part of the frame member 5, and the filter 7 provided to at at least a part of the vent hole 6, wherein the phase correction member 20 is either bonded to, or disposed near, the polarizer member 3 or the liquid crystal cell 2, or is disposed inside the space 4 defined between the polarizer member 3 and the liquid crystal cell 2.

In other words, this embodiment of the present invention has a construction wherein the phase correction member 20 is added to the basic construction of the liquid crystal display unit of the invention shown in FIG. 2, and several forms can be conceived depending on the position of this phase correction member 20.

In the embodiment shown in FIG. 14, the phase correction member 20 is disposed on the outside surface of the liquid crystal cell 2, that is, in the direction towards the light source when the liquid crystal display unit is assembled in the liquid crystal projector, and moreover, the liquid crystal cell 2 and the phase correction member 20 are bonded in close contact with each other.

In the present invention, the liquid crystal cell 2 and the phase correction member 20 may be disposed with a predetermined gap between them.

Further, the phase correction member 20 may be disposed on the surface of the liquid crystal cell 2 the surface of which being on the opposite to the polarizer member 3; or in close contact with the same surface of the liquid crystal cell 2 with a predetermined gap between them, and may also be disposed in the proximity of the polarizer member 3 or may be bonded to the polarizer member 3.

In the embodiment of the present invention described above, the phase correction member 20 is preferably disposed on the outside surface of the liquid crystal cell 2 so as to prevent the adhesion of the dust on the surface of the liquid crystal cell 2 and to protect the surface of the liquid crystal cell 2 from damage. Further, when the liquid crystal cell is used as the liquid crystal display unit of the liquid crystal projector, the surface of the liquid crystal cell 2 opposing the light source 200 of the liquid crystal projector is preferably covered with the phase correction member 20.

The surface of the phase correction member 20 is preferably cooled by cooling air.

The thickness of the phase correction member 20 in the present invention is not particularly limited but when the liquid crystal display unit 1 is used as the liquid crystal display unit of the liquid crystal projector, the design is preferably made in such a manner that the outside surface of the phase correction member is outside the depth of focus of the projection lens of the liquid crystal projector, because, even when the dust adheres to the outside surface of the phase correction member 20, the dust is not seen on a projected image.

Figure 15:
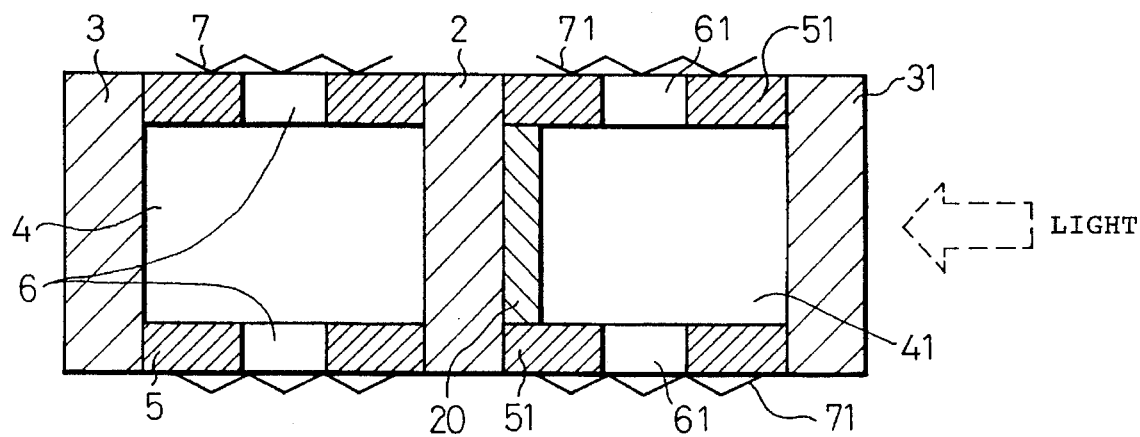
FIGS. 15 and 16 are sectional views each showing an example wherein a phase correction member is interposed between a first polarizer member and the liquid crystal cell and is bonded to the surface of the liquid crystal cell.

Still another embodiment of the invention is shown in FIG. 15. Namely, this embodiment represents the liquid crystal display unit 1 which uses two polarizer members, and has the construction wherein the first polarizer member 31, at least one phase correction member 20, at least one liquid crystal cell 2 and the second polarizer member 3 are disposed in order named along the optical axis. The display unit 1 further includes the frame member 5, 51 for defining the space 4, 41 at least between the second polarizer member 3 and the liquid crystal cell 2 or between the liquid crystal cell 2 and the phase correction member 20 or between the phase correction member 20 and the first polarizer member 31, the vent hole 6, 61 formed at at least a part of the frame member 5, 51 and the filter 7, 71 disposed at at least a part of the vent hole 6, 61.

As a preferred embodiment of this embodiment, the filter 71 is disposed at the vent hole 61 of the space 41 and cooling air is caused to flow into this space 41.

According to such a construction, dust is prevented from adhering to the liquid crystal cell 2, the surface of the liquid crystal cell 2 can be protected from damage, and a temperature rise in the liquid crystal cell 2 can be effectively prevented.

Figure 16:
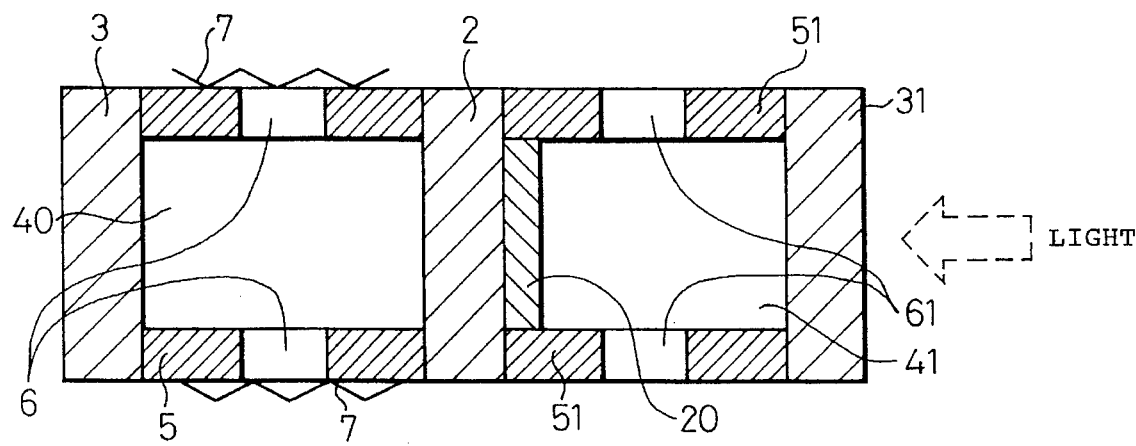

Still another embodiment of the invention described above is shown in FIG. 16. Namely, this embodiment employs a construction wherein the filter 71 is not provided to the vent hole 61 formed in the frame member 51 for defining the space 41 between the first polarizer member 31 and the phase correction member 20 as shown in the drawing. As described above, when design is made in such a manner that the outside surface of the phase correction member 20 exists outside the depth of focus of the projection lens of the liquid crystal projector, the dust cannot be seen on the projected image even if the dust adheres to the outside surface of the phase correction member 20. Accordingly, the filter becomes unnecessary, and the cooling effect of the liquid crystal cell 2 can be improved.

Figure 17:
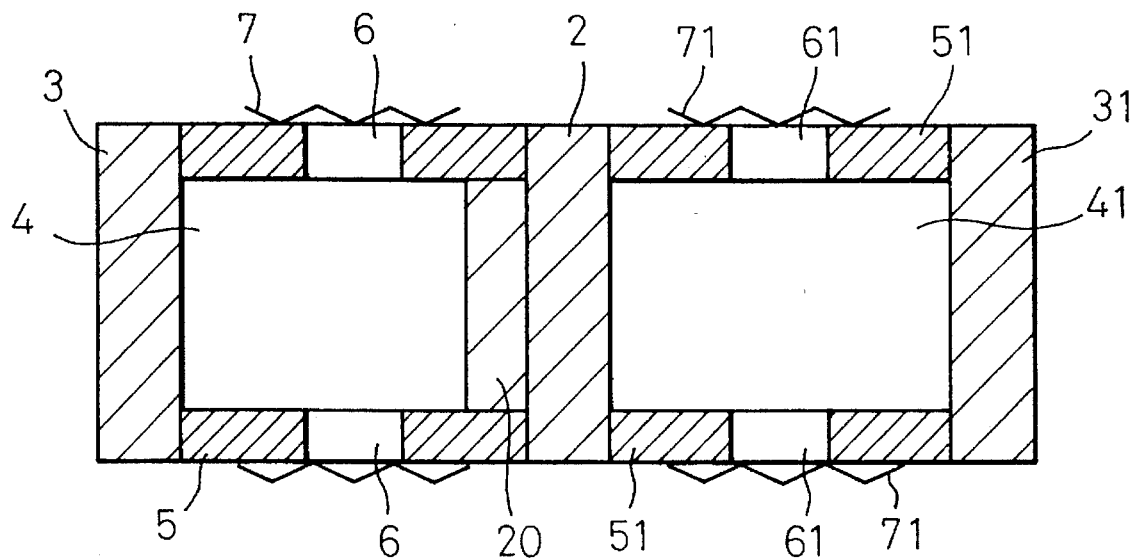
FIG. 17 is a sectional view showing an example wherein the phase correction member is interposed in a space between a second polarizer member and the liquid crystal cell and is bonded to the surface of the liquid crystal cell.

FIG. 17 shows still another embodiment of the liquid crystal display unit 1 of the invention described above. This embodiment comprises the liquid crystal display unit 1 comprising the first polarizer member 31, at least one liquid crystal cell 2, at least one phase correction member 20, and the second polarizer member 3, which are disposed in the order given along the optical axis. The display unit 1 further includes the frame member 5, 51 for defining the space 4, 41 at least between the first polarizer member 3 and the liquid crystal cell 2 or between the liquid crystal cell 2 and the phase correction member 20 or between the phase correction member 20 and the second polarizer member 3, the vent hole 6, 61 formed at at least a part of the frame member 5, 51 and the filter 7, 71 disposed at at least a part of the vent hole 6, 61.

This embodiment is mainly directed to effect color correction of the liquid crystal cell 2, and can further compensate for the temperature characteristics of the liquid crystal cell 2. Furthermore, the filter 71 must be disposed at the vent hole 61 of the frame member 51 constituting the space 41.

Figure 18:
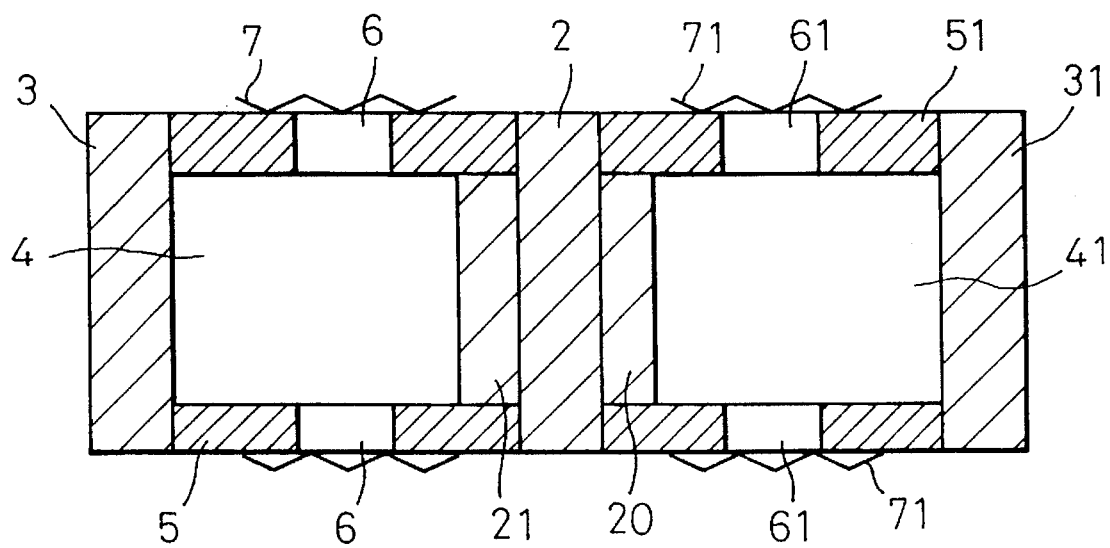
FIG. 18 is a sectional view showing an example of a liquid crystal display unit wherein the first and second phase correction members are disposed on both surfaces of the liquid crystal cell.

FIG. 18 shows still another embodiment of the liquid crystal display unit 1 of the invention described above. The liquid crystal unit 1 comprises the first polarizer member 31, at least one liquid crystal cell 2, the second polarizer member 3 and at least two phase correction members 20, 21. The first phase correction member 20 is interposed between the first polarizer member 31 and the liquid crystal cell 2 and the second phase correction member 21 is interposed between the liquid crystal cell 2 and the second polarizer member 3. The liquid crystal display unit 1 further includes the frame members 5, 51, for defining the space 4, 41, at least between the first polarizer member 31 and the first phase correction member 20 or between the first phase correction member and the liquid crystal cell 2, or between the liquid crystal cell 2 and the second phase correction member 21, or between the second phase correction member 21 and the second polarizer member 3, the vent hole 6, 61 formed at at least a part of the frame member 5, 51 and the filter 7, 71 provided at at least a part of the vent hole 6, 61.

The connection method between the polarizer members, the liquid crystal cell and the phase correction members, the connection method between these members and the frame member, etc, are the same as the connection methods used in the foregoing embodiments.

Figure 19:
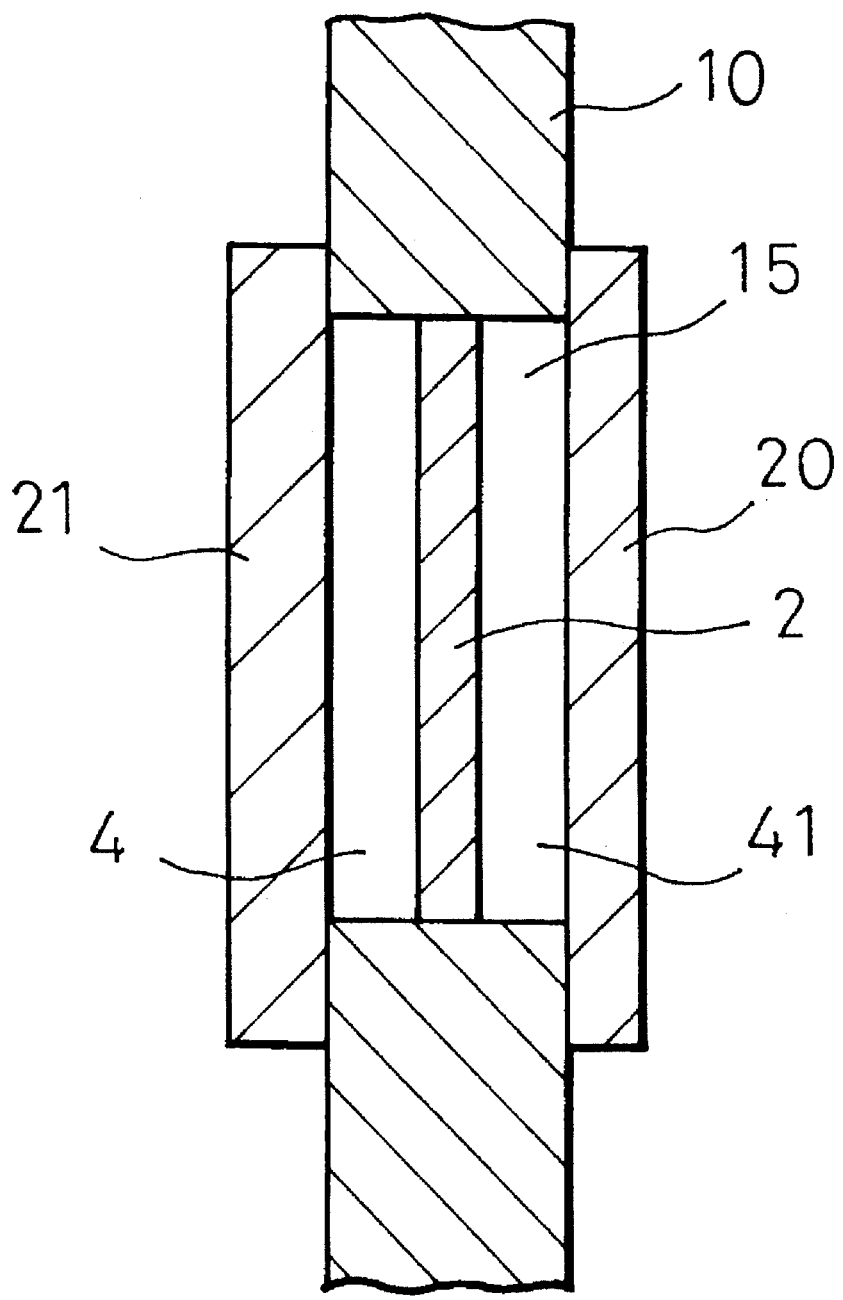
FIG. 19 is a sectional view showing an example of a bonding method of the liquid crystal cell to the two phase correction members in the liquid crystal cell shown in FIG. 18.

In the embodiment shown in FIG. 18, in particular, a method shown in FIG. 19 can be used as the bonding method between the liquid crystal cell 2 and the two phase correction members 20, 21.

In other words, the liquid crystal cell 2 is fitted and fixed to the opening of the liquid crystal cell support 10 and the window 15, and the first and second phase correction members 20, 21 are arranged and fixed to both surface of the liquid crystal cell support 10 in such a manner as to cover the window 15. In this way, the space 4, 41 between the liquid crystal cell 2 and the phase correction member 20, 21 can be set to a predetermined gap.

Figure 20:
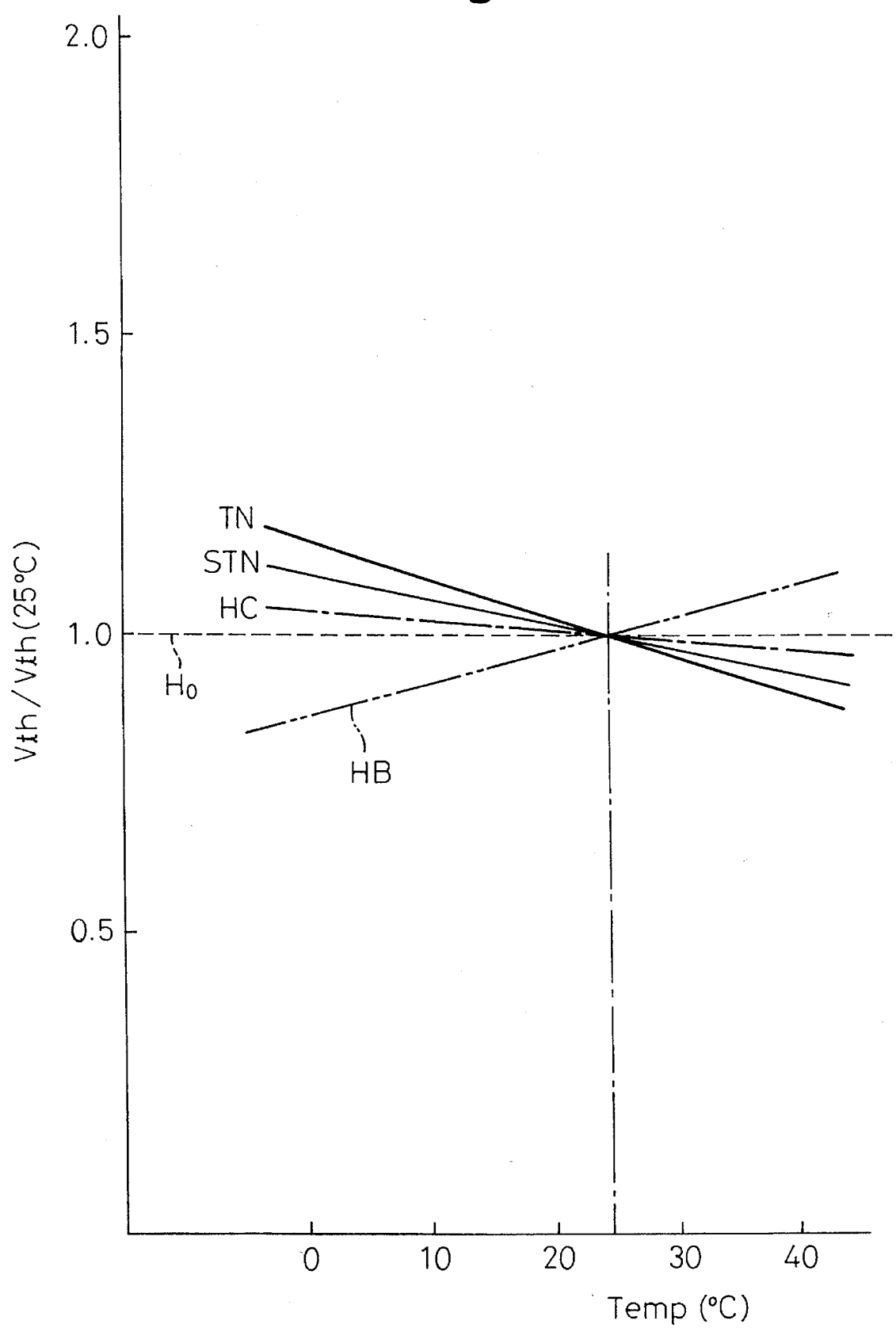
FIG. 20 is a graph showing the effect when the liquid crystal cell and the phase correction members are used in combination with one another.
Figure 7:
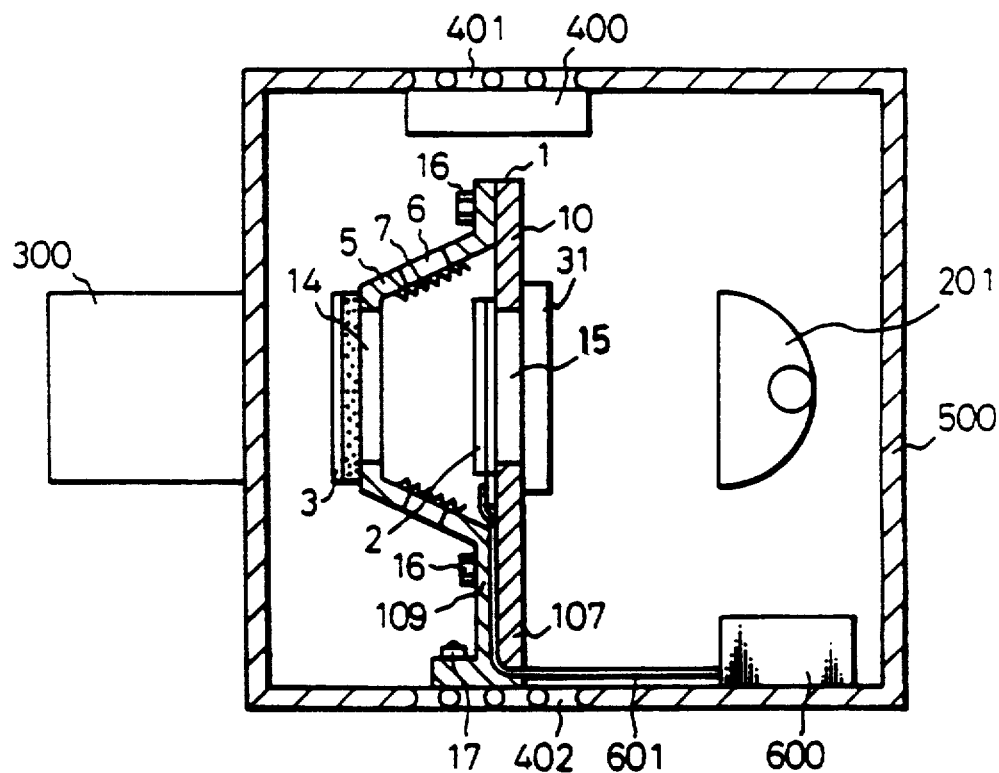
Figure 10:
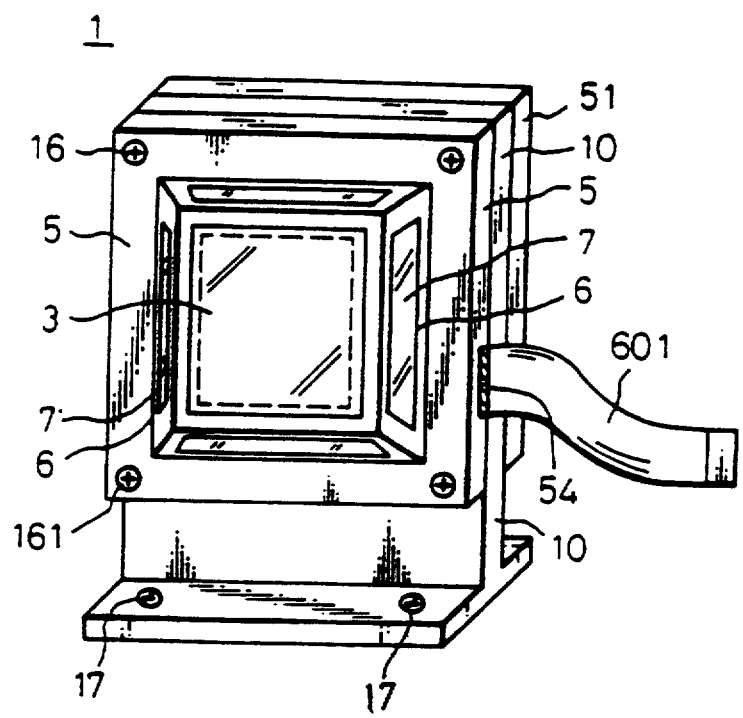
Figure 13:
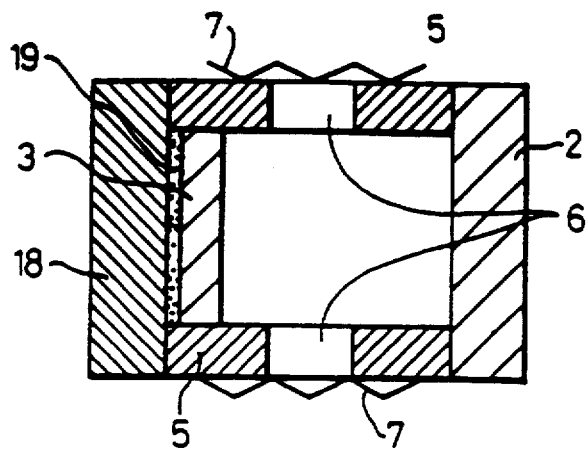
Figure 14:
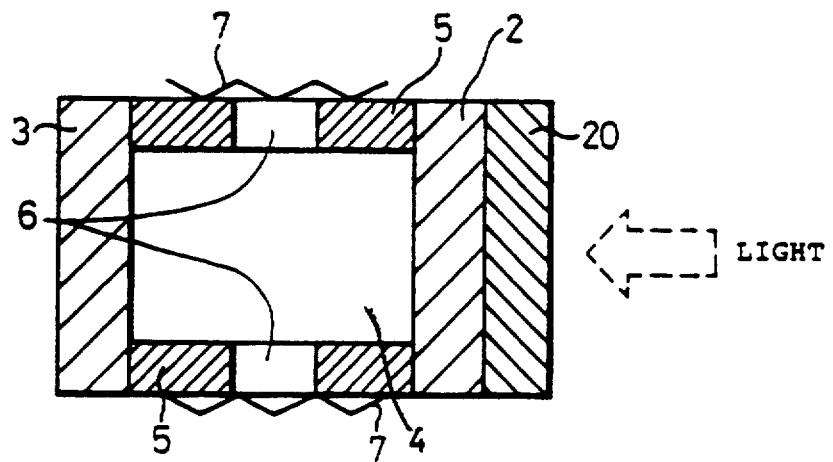
Figure 15:
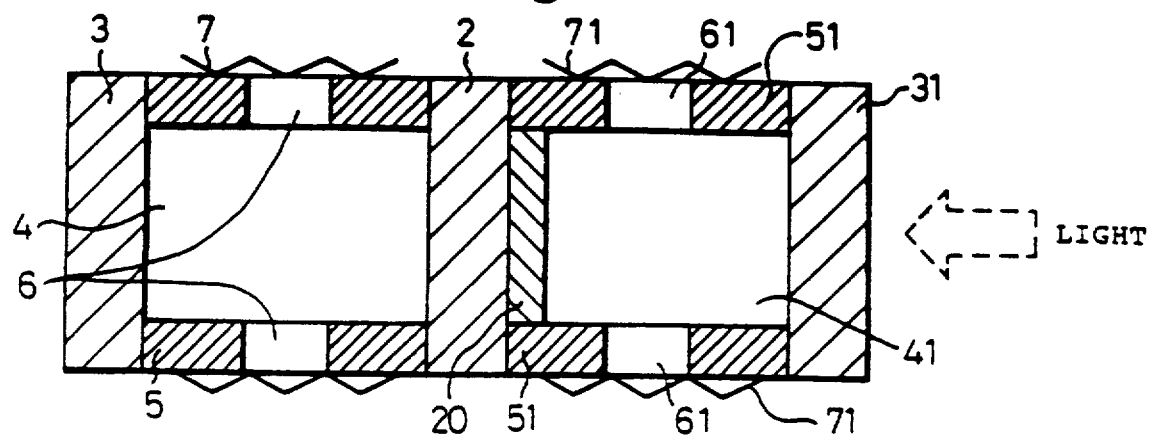
Figure 16:
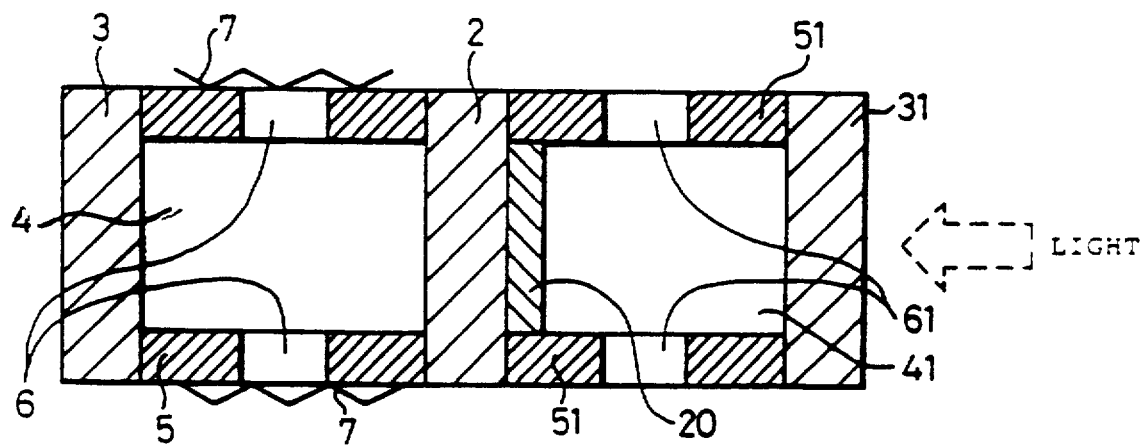

The phase correction member 20 used in the present invention preferably has opposite the temperature characteristics to the liquid crystal cell 2 used, as already described, and the effect is shown in FIG. 20.

FIG. 20 is a graph showing the temperature characteristics of TN and STN liquid crystal cells as the typical liquid crystal cells used in the present invention in terms of the change of a ratio of a threshold voltage $V_{th}$ (25° C.) at 25° C. to a threshold voltage $V_{th}$ with a temperature change, that is, $V_{th}/V_{th}(25°\ C.)$, with respect to an ambient temperature.

The temperature characteristics of the TN and STN type liquid crystal cells exhibit negative characteristics to the temperature rise. Accordingly, the temperature characteristics of the TN or STN type liquid crystal cell can be flattened as represented by symbol HC by constituting the phase correction member 20 by a material having positive temperature characteristics as represented by dotted line HB and combining it with the TN or STN type liquid crystal cell.

Ideally, the phase correction member 20 must be designed so that the graph becomes the dashed line graph H0 which exhibits constant characteristics irrespective of the temperature as shown in FIG. 20.

The construction of the liquid crystal display unit using the phase correction member 20 according to the present invention can be used in combination with all the constructions not using the phase correction member.

The phase correction member 20 may be constituted by a liquid crystal cell having a phase correction function in the same way as the one used as the liquid crystal cell 2, and may also be constituted by a film having a phase correction function.

When the liquid crystal cell type member is used as the phase correction member 20 in the present invention, a liquid crystal cell made of the same material as the liquid crystal cell used as the driving liquid crystal cell 2 of the liquid crystal display unit is preferably used, and in such a case, electrodes similar to those of the driving liquid crystal cell 2 of the liquid crystal display unit need not be provided, but the orientation of this liquid crystal is preferably opposite to the orientation of the driving liquid crystal cell 2.

When a member consisting of a film is used as the phase correction member 20 in the present invention, "NRZ440" produced by Nitto Denko K.K., for example, can be suitably used.

Furthermore, when the liquid crystal cell unit 1 constituted by the use of such a phase correction member 20 according to the present invention is used for the liquid crystal projector, it is preferred that the phase correction member 20 be disposed on the light input side and the liquid crystal cell 2, on the light output side.

In the present invention, an opposite construction to the above, that is, a construction wherein the phase correction member 20 is disposed on the light output side and the liquid crystal cell is disposed, on the light input side, can also be used in the liquid crystal display unit comprising the liquid crystal display unit 1 and the light source 201 and using the phase correction member 20 described above.

Further, it is possible in the present invention to constitute the liquid crystal projector using the liquid crystal display unit 1 constituted by the use of the phase correction member 20 described above. As a definite structural example, the liquid crystal projector comprises an illumination device 203 comprising an illumination optical system including at least the light source 201 and the condenser lens 202, the projection optical system 300 and the liquid crystal display unit 1 described above. More definitely, as shown in FIG. 18, the first polarizer member 31 in the liquid crystal display unit is preferably disposed at the light source side and in another embodiment, the first polarizer member 31 or the first phase correction member 20 in the liquid crystal display unit are both preferably disposed at the light source side relative to the liquid crystal cell 2.

The fan 400 is provided to the liquid crystal display unit 1 so as to generate an air stream in the same way as in the foregoing embodiments.

In the embodiment described above, too, the heat absorption filter may be disposed between the illumination device and the liquid crystal display unit in the same way as in the embodiment using the liquid crystal display unit not using the phase correction member, and this heat absorption filter may, of course, be interposed between the illumination optical system and the liquid crystal display unit.

The foregoing embodiments illustrate the liquid crystal display unit 1 using only one liquid crystal cell 2 or the liquid crystal projector 200 using such a liquid crystal display unit 1. However, when an RGB color separation/synthesis system must be employed for a color display, or the like, the liquid crystal display unit or the liquid crystal projector must obviously be constituted by the use of at least three liquid crystal cells.

In such a case, two or more, or a plurality of liquid cells, are used to constitute one liquid crystal display unit, and such a unit is incorporated on the basis of the present invention. By the way, the positional relationship between the polarizer member and the liquid crystal cell may be sufficient when they oppose each other on the optical axis. Accordingly, when the optical axis is refracted by a reflecting mirror, or the like, the positional relationship between the polarizer member and the liquid crystal cell need not always be parallel to each other.

EFFECT OF THE INVENTION

As described above, since the present invention employs a sealed construction to prevent the accumulation of dust on the liquid crystal cell, the dust does not adhere to the liquid crystal cell and the image of the dust is not projected by the projection lens as the optical system and does not deteriorate the quality of the projected image. Further, it is only on the outside surface of the polarizer member inside the liquid crystal projector that the dust adheres inside the liquid crystal projector, and the dust adhering to the polarizer member is outside the depth of focus of the projection lens. Accordingly, the dust does not appear on the projected image, and the quality of the projected image is not deteriorated. Further, after-care against the dust is not necessary and a high quality projected image can be obtained. Since the liquid crystal cell has a sealed structure, seal of the casing need not be as strict as has been necessary in the prior art apparatuses. When the casing is opened and closed for exchanging the lamp as the illumination means, a high level of skill and jigs produced by the manufacturer are not necessary, so that inspection and maintenance becomes easier.

Since the liquid crystal display unit according to the present invention uses the phase correction member, it is possible to eliminate the problems such as pixel quality and contrast changes with the temperature change where the display quality becomes ineferior due to a change in the colors.

We claim:

1. A liquid crystal display unit comprising:
a frame member having opposing surfaces, at least one polarizer member, a frame member having opposing surfaces, a liquid crystal cell and one of said polarizer members mounted to the opposing surfaces, said frame member defining an enclosed space between said cell and said one of said polarizer members, the frame member having a vent hole formed in at least a part thereof, and a filter disposed in at least a part of said vent hole.

2. A liquid crystal display unit comprising a first polarizer member, at least one liquid crystal cell, a second polarizer member, and a frame member disposed so as to define an enclosed space at least between said first polarizer member and said at least one liquid crystal cell or between said at least one liquid crystal cell and said second polarizer member, said frame member having a vent hole formed in at least a part thereof, and a filter disposed in at least a part of said vent hole.

3. A liquid crystal projector comprising:
a housing;
an illumination device including a light source and an illumination optical system and a projection optical system mounted in the housing along an optical axis;
a liquid crystal display unit mounted in the housing along the optical axis between the light source and the projection optical system; the liquid crystal display unit, including
a frame member, at least one liquid crystal cell and at least one polarizer member mounted to the frame member, said frame member being spaced from the housing and defining an enclosed space between said at least one liquid crystal cell and said at least one polarizer member, said frame member having a vent hole formed therein, and a
filter covering said vent hole.

4. The liquid crystal projector of claim 3 wherein the projection optical system has a predetermined focal depth, the space between the at least one liquid crystal cell and said at least one polarizer member along the optical axis being greater than said focal depth, whereby any dust in the space defined by the frame is out of focus during operation of the projector.

5. A liquid crystal display unit comprising at least one liquid crystal cell, at least one polarizer member, at least one phase correction member, a frame member defining an enclosed space at least between said polarizing member and said liquid crystal cell or between said polarizer member and said phase correction member, said frame member having a vent hole formed in at least a part thereof, a filter disposed in at least a part of said vent hole, said phase correction member being disposed in proximity to said polarizer member or in proximity to said liquid crystal cell, or said phase correction member being bonded to said polarizer member or said liquid crystal cell, or disposed inside the defined space between said polarizer member and said liquid crystal cell.

6. A liquid crystal display unit comprising a first polarizer member, at least one liquid crystal cell, at least one phase correction member and a second polarizer member all disposed in the order named along an optical axis, a frame member defining an enclosed space at least between said first polarizer member and said liquid crystal cell or between said liquid crystal cell and said phase correction member or between said phase correction member and said first polarizer member, said frame member having a vent hole formed in at least a part thereof, and a filter disposed in at least a part of said vent hole.

7. A liquid crystal display unit comprising a first polarizer member, at least one liquid crystal cell, a second polarizer member and at least two phase correction members, said first phase correction member being disposed between said first polarizer member and said liquid crystal cell with said second phase correction member being disposed between said liquid crystal cell and said second polarizer member, a frame member defining an enclosed space at least between said first polarizer member and said first phase correction member or between said first phase correction member and said liquid crystal cell or between said liquid crystal cell and said second phase correction member or between second phase correction member and said second polarizer member, said frame member having a vent hole formed in at least a part thereof, and a filter is disposed in at least a part of said vent hole.

8. A liquid crystal display unit comprising a first polarizer member, at least one phase correction member, at least one liquid crystal cell, and a second polarizer member all disposed in the order named along an optical axis, a frame member defining an enclosed space at least between said second polarizer member and said liquid crystal cell or between said liquid crystal cell and said phase correction member or between said phase correction member and said first polarizer member, said frame member having a vent hole formed in at least a part thereof, and a filter disposed in at least a part of said vent hole.

9. A liquid crystal display unit according to claims 1 or 2 or 5 or 8 further comprising a polarizer member support supporting at least one of said polarizer members.

10. A liquid crystal display unit according to claim 9 wherein said polarizer member support comprises a heat reflection filter.

11. A liquid crystal display unit according to claim 9 wherein said polarizer member support is made of plastic.

12. A liquid crystal display unit according to claim 9 wherein said polarizer member support comprises a liquid crystal, the liquid crystal having molecules with a twist angle equal to or less than 180 degrees.

13. A liquid crystal display unit according to claim 9, wherein at least one of said polarizer members is bonded to said polarizer member support.

14. A liquid crystal display unit according to claim 9 wherein said polarizer member support is made of glass.

15. A liquid crystal display unit according to claim 9 wherein said polarizer member support is supported by said frame member.

16. A liquid crystal display unit according to claims 1 or 2 or 5 or 8 wherein at least one of said polarizer members is disposed such that a surface thereof constitutes an outside surface of said liquid crystal display unit.

17. A liquid crystal display unit according to claims 1 or 2 or 5 or 8 wherein one of said polarizer members is disposed such that a surface thereof constitutes an inside surface of said liquid crystal display unit.

18. A liquid crystal projector comprising the liquid crystal display unit claimed in claims 1, 2, 13, or 8 further including at least a fan for generating an air stream inside said liquid crystal display unit.

19. A liquid crystal display unit according to claims 5 or 8 wherein said at least one phase correction member is made of a light transmitting material having opposite temperature characteristics to said liquid crystal cell.

20. A liquid crystal display unit according to claims 5 or 8 wherein said cell and said members are disposed in order named along an optical axis, said liquid crystal cell and said second polarizer member defining a space between them, said phase correction member and said first polarizer member defining a space between them, and said vent hole formed in at least a part of said frame member defining said space.

21. A liquid crystal display unit according to claims 5 or 8, wherein said phase correction member comprises a liquid crystal cell.

22. A liquid crystal display unit according to claims 5 or 8, wherein said phase correction member comprises a phase correction film.

23. A liquid crystal projector comprising said liquid crystal display unit claimed in claims 1, 2, 5, or 8, and further comprising an illumination device, including at least a light source and an illumination optical system, and a projection optical system.

24. A liquid crystal projector comprising said liquid crystal display unit claimed in claims 1, 2, 5, or 8, wherein said at least one polarizer member is a first polarizer member and said first polarizer member in said liquid crystal display unit is disposed on the light source side.

25. A liquid crystal projector comprising said liquid crystal display unit claimed in claims 1, 2, 5, or 8, wherein said at least one polarizer member is a first polarizer member, said first polarizer member or said first phase correction member in said liquid crystal display unit is disposed on the light source side with respect to said liquid crystal cell.

26. A liquid crystal projector comprising said liquid crystal display unit claimed in claims 1, 2, 5, or 8, and further including a fan for generating an air stream for said liquid crystal display unit.

27. A liquid crystal display device comprising said liquid crystal display unit claimed in claims 1, 2, 5 or 8 and further comprising a heat absorbing filter, an illumination device, said heat absorbing filter being disposed between said illumination device and said liquid crystal display unit, 28. A liquid crystal display device comprising said liquid crystal display unit claimed in claims 1, 2, 5, or 8 and further comprising a heat absorbing filter, and an illumination optical system, said heat absorbing filter being disposed between said illumination optical system and said liquid crystal display unit,

* * * * *

UNITED STATES PATENT AND TRADEMARK OFFICE
CERTIFICATE OF CORRECTION

PATENT NO. : 5,508,830
DATED : April 16, 1996
INVENTOR(S) : SATOSHI OMOTO ET AL.

It is certified that error appears in the above-indentified patent and that said Letters Patent is hereby corrected as shown below:

Claim 27, column 18, line 47 before "or" insert a comma (--,--).

Signed and Sealed this

Twenty-fourth Day of September, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,508,830
DATED : April 16, 1996
INVENTOR(S) : Satoshi Omoto, et. al.

It is certified that error appears in the above-identified patent and that said Letters Patent is hereby corrected as shown below:

Drawings:

Delete Drawing Sheets consisting of Figs. 7, 10, 14 and 16 and substitute therefor Figs. 7, 10, 14 and 16 as shown on the attached pages.

Signed and Sealed this

Eighth Day of April, 1997

*Attest:*

BRUCE LEHMAN

*Attesting Officer*     *Commissioner of Patents and Trademarks*